United States Patent
Birrer et al.

(10) Patent No.: US 10,601,914 B2
(45) Date of Patent: Mar. 24, 2020

(54) METHOD AND APPARATUS FOR SYNCHRONIZING APPLICATIONS' CONSUMPTION OF REMOTE DATA

(71) Applicant: Phenix Real Time Solutions, Inc., Chicago, IL (US)

(72) Inventors: Stefan Birrer, Chicago, IL (US); Fabián Bustamante, Evanston, IL (US); Andrew Joseph Weiner, Chicago, IL (US)

(73) Assignee: PHENIX REAL TIME SOLUTIONS, INC., Chicago, IL (US)

( * ) Notice: Subject to any disclaimer, the term of this patent is extended or adjusted under 35 U.S.C. 154(b) by 51 days.

(21) Appl. No.: 15/948,937

(22) Filed: Apr. 9, 2018

(65) Prior Publication Data

US 2018/0309827 A1    Oct. 25, 2018

Related U.S. Application Data

(60) Provisional application No. 62/489,264, filed on Apr. 24, 2017.

(51) Int. Cl.
*H04L 29/08* (2006.01)
*H04N 5/04* (2006.01)
(Continued)

(52) U.S. Cl.
CPC ...... *H04L 67/1095* (2013.01); *H04L 65/4076* (2013.01); *H04L 65/607* (2013.01);
(Continued)

(58) Field of Classification Search
CPC ... H04L 67/1095; H04L 65/607; H04L 65/80; H04L 65/4076; H04N 21/242; H04N 21/8547; H04N 21/4305; H04N 5/04
See application file for complete search history.

(56) References Cited

U.S. PATENT DOCUMENTS 8,307,089 B1 * 11/2012 Rothschild .......... H04L 67/1097
709/226
2006/0056337 A1    3/2006 Yoon
(Continued)

OTHER PUBLICATIONS

Vingelmann, Peter, et al., "Synchronized multimedia streaming on the iphone platform with network coding", IEEE Communications Magazine; retrieved online from url: http://kom.aau.dk/~ff/documents/ccnc2011.pdf, Jun. 7, 2011, 8 pages.

*Primary Examiner* — Kim T Nguyen
(74) *Attorney, Agent, or Firm* — Perkins Coie LLP

(57) ABSTRACT

Presented here are methods and systems for enabling multiple consumers to view an ordered data stream at the same time. An embodiment of the invention follows a client-server model, in which there is one server that is the source of the data and multiple clients that are the consumers of the data. Additionally, this invention can also be embodied by a number of other models, including but not limited to: 1) multiple servers or server clusters acting as data sources, and multiple clients acting as consumers, 2) pure peer-to-peer, where each peer can be both a source and/or a consumer of data, 3) a server-assisted peer-to-peer model, where peers may be both a source and/or a consumer of data and a set of one or more servers act as source and back-up and provide meta-information about the peers, such as which data is available from which peer.

5 Claims, 32 Drawing Sheets

(51) Int. Cl.
*H04N 21/242* (2011.01)
*H04L 29/06* (2006.01)
*H04N 21/8547* (2011.01)
*H04N 21/43* (2011.01)

(52) U.S. Cl.
CPC ............... *H04L 65/80* (2013.01); *H04N 5/04* (2013.01); *H04N 21/242* (2013.01); *H04N 21/4305* (2013.01); *H04N 21/8547* (2013.01)

(56) References Cited

U.S. PATENT DOCUMENTS

| | | |
|---|---|---|
| 2009/0044216 A1 | 2/2009 | McNicoll et al. |
| 2010/0177708 A1 | 7/2010 | Pandey et al. |
| 2011/0154417 A1 | 6/2011 | Civanlar et al. |
| 2013/0014200 A1 | 1/2013 | Stokking et al. |
| 2015/0052571 A1* | 2/2015 | Stokking .............. H04N 21/242 725/116 |

* cited by examiner

In this example some data consumer's priority queue contains one video frame with a GCTS provided by the data source, and the data consumer has calculated the corresponding LCTS.

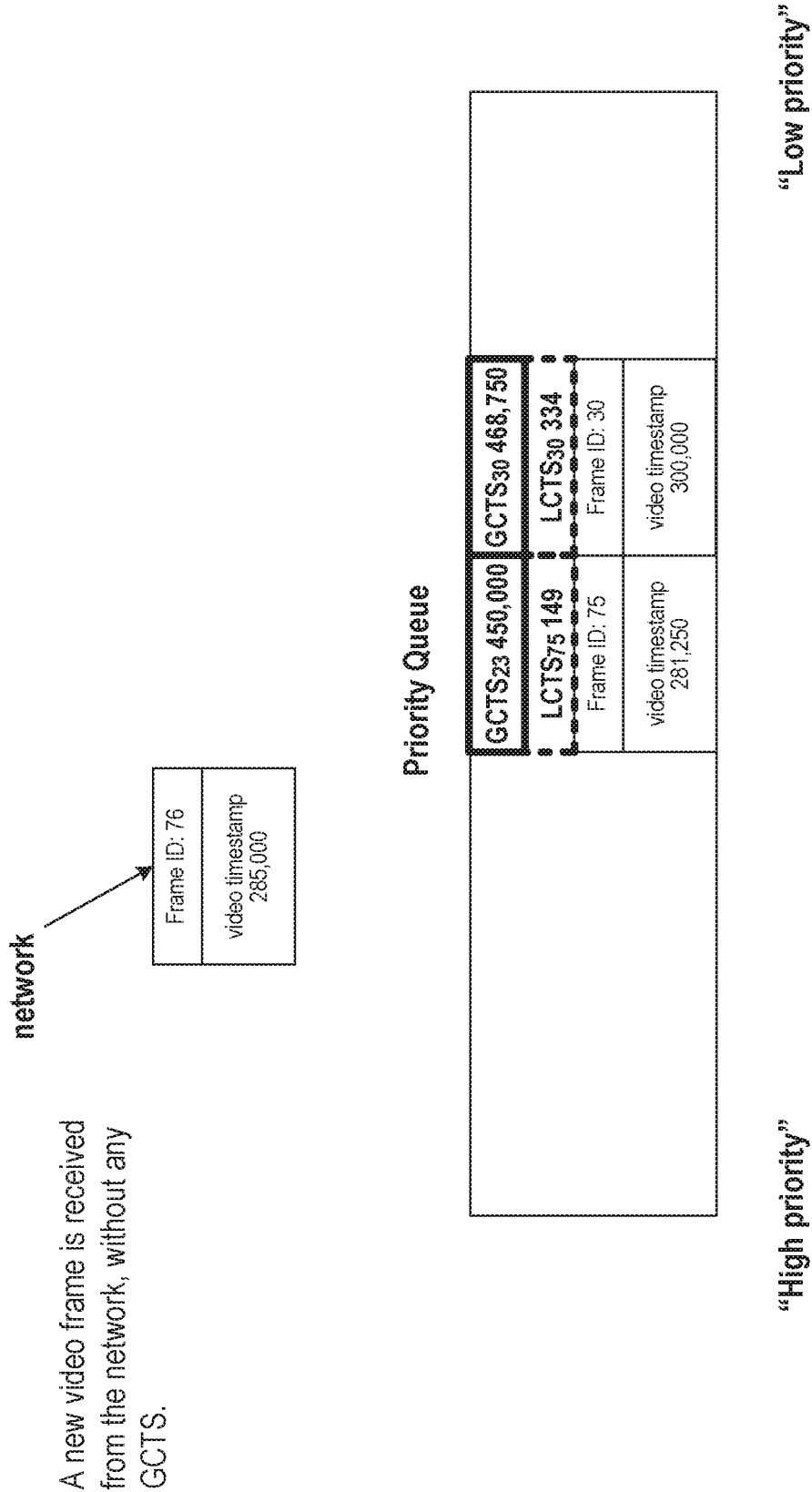

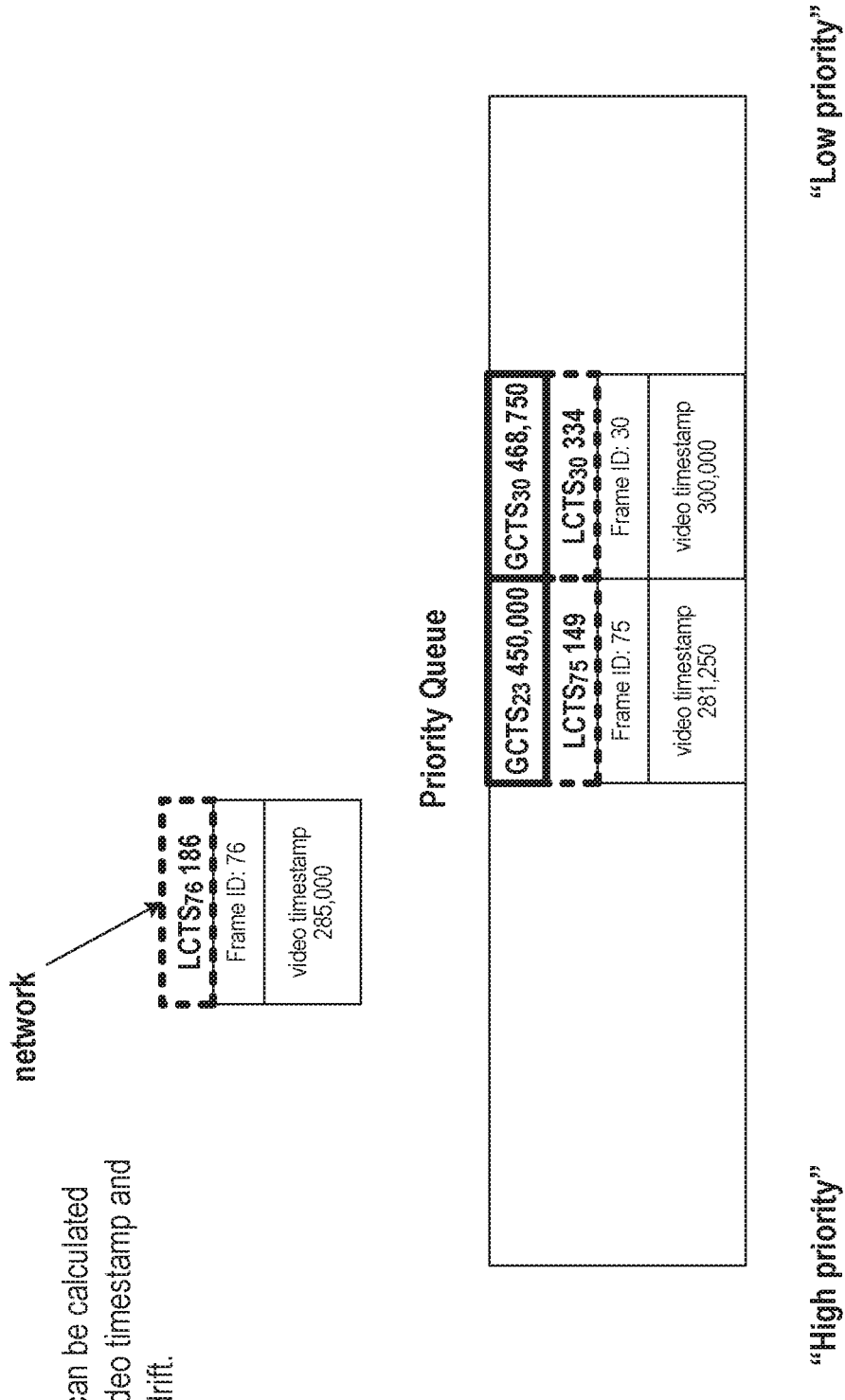

This video frame can then be properly placed in the priority queue.

Priority Queue

| GCTS23 450,000 | GCTS76 186 | GCTS30 468,750 |
|---|---|---|
| LCTS75 149 | LCTS76 186 | LCTS30 334 |
| Frame ID: 75 | Frame ID: 76 | Frame ID: 30 |
| video timestamp 281,250 | video timestamp 285,000 | video timestamp 300,000 |

"High priority" → "Low priority"

*FIG. 21H*

METHOD AND APPARATUS FOR SYNCHRONIZING APPLICATIONS' CONSUMPTION OF REMOTE DATA

CROSS-REFERENCE TO RELATED APPLICATIONS

This application claims priority to the U.S. provisional patent application Ser. No. 62/489,264 filed Apr. 24, 2017 which is incorporated herein by reference in its entirety.

TECHNICAL FIELD

The present application is related to a distribution of data, and more specifically to methods and systems for synchronizing applications' consumption of remote data.

BACKGROUND

Streaming applications are subject to network latencies and other delays. As such, users of a given streaming application (e.g. streaming video) typically do not see the same frame at the same time. If these users are also engaged in a chat session or other real-time communication while using the streaming application, it is difficult to maintain a meaningful conversation in such case because the participants are often not discussing the same thing. That is, one participant may be commenting on something that another participant has not yet seen.

SUMMARY

Presented here are methods and systems for enabling multiple consumers to view an ordered data stream at the same time. An embodiment of the invention follows a client-server model, in which there is one server that is the source of the data and multiple clients that are the consumers of the data. Additionally, this invention can also be embodied by a number of other models, including but not limited to: 1) multiple servers or server clusters acting as data sources, and multiple clients acting as consumers, 2) pure peer-to-peer, where each peer can be both a source and/or a consumer of data, 3) a server-assisted peer-to-peer model, where peers may be both a source and/or a consumer of data and a set of one or more servers act as sources and back-ups and provide meta-information about the peers, such as which data is available from which peer.

BRIEF DESCRIPTION OF THE DRAWINGS

FIGS. 21A-21H show priority-based ordering of data according to the invention.

DETAILED DESCRIPTION

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

Definitions

The following paragraphs include a set of definitions we use throughout the document.

Data Chunks and Frames

We use data chunks (DataChunk) to mean a collection of data frames, possibly one, with an associated consumption timestamp. In an exemplary embodiment of the invention, each data frame is composed of a frame identifier, a data timestamp, and the data itself. In other embodiments, such as where the consumption timestamp is sent as a header field along with each data frame, the frame identifier and data timestamp are optional. We use timestamps to indicate priority but this can be straightforwardly generalized, e.g. based on frame type or source.

DataChunk::=ConsumptionTS {DataFrame} 1–n
DataFrame::=(FrameID) (DataTS) Data

Figure 2:
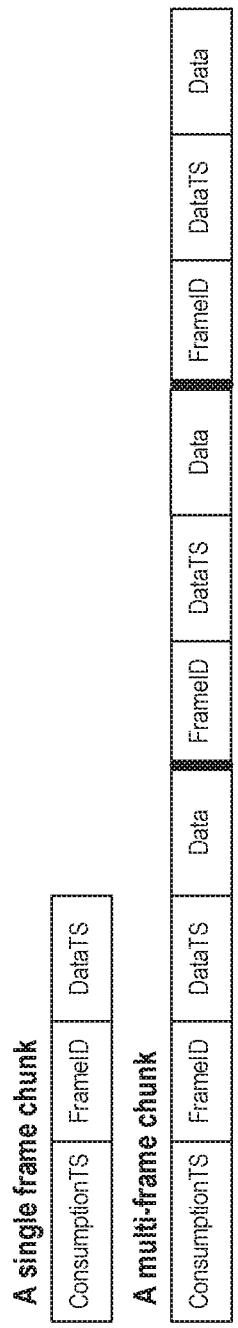
FIG. 2 shows an example of a single-frame data chunk and a multi-frame data chunk.

FIG. 2 illustrates this with both a single and a multi-frame data chunk.

Buffering Consumption

Data chunks arrive at a client and are placed into a buffer (FIG. 21A-H) from which they are consumed. Using video as an example, data chunks are made of multiple video frames and these frames are consumed from the incoming buffer for rendering. In a different instantiation of this model, the consumed data chunks and frames can be passed on to a third-party application. Again, using video as an example, this could be a Media Service Extension built into most HTML5 enabled browsers.

Buffer Consumption and Consumption Time

Upon receiving a data chunk with a consumption timestamp CT, a client i with local time $LC_i$ either buffers the chunk's frames, plays them immediately, or discards a subset of them, i.e. a part of the chunk, depending on the difference between $LC_i$ and CT.

Synchronized Group

We use the term synchronized group to refer to a group of devices composed of data sources and consumers where all consumers wish to consume data at the same time.

Synchronizing Applications' Consumption of Remote Data

Embodiments of the invention provide an approach for the synchronized consumption of digital data, e.g. video, among a group of clients. The consumed data is contributed by one or a collection of sources, and clients and data sources are assumed to be connected over the Internet and to share neither memory nor a group clock. The synchronized consumption supported by the invention enables clients to interact with each other simultaneously, in relation to the shared content consumed, as if they were physically collocated.

Embodiments of the invention provide a method and apparatus for synchronizing the consumption of remote data by two or more client applications when the client applications do not share a group clock. In embodiments of the invention, the participants use a clock synchronization algorithm as described below.

To provide context, we first describe one example of an intended use of embodiments of the invention. There are two people in different cities who wish to watch a video, streamed from the Internet, at the same time. While they are watching the video, they want to discuss the events of the video using a phone call, text, chat, or other real-time communication method. They want to be sure that the playing of the video as viewed by one person is synchronized with the playing of the video as viewed by the other person, so that their discussion is clear and so that one person does not refer to events in the video that the other person has not yet seen. Embodiments of the invention synchronize the playback of the video for the two people in this example.

A presently preferred embodiment of the invention is composed of a series of steps that are performed by two or more computer applications. The performance of these steps results in the synchronized consumption of data by the two computer applications, even when the origin of the data and the devices running the computer applications are all geographically separated.

An embodiment of the invention follows a client-server model, in which there is one server that is the source of the data and multiple clients that are the consumers of the data. Thus, we use the terms "server" and "data source" interchangeably. Likewise, we use the terms "client" and "consumer" interchangeably. However, this invention can also be embodied by a number of other models, including but not limited to:

Multiple servers or server clusters acting as data sources, and multiple clients acting as consumers.

Pure peer-to-peer, where each peer can be both a source and/or a consumer of data.

A server-assisted peer-to-peer model, where peers may be both a source and/or a consumer of data and a set of one or more servers act as sources and back-ups and provide meta-information about the peers, such as which data is available from which peer.

Whenever a new member joins a synchronized group, it must execute the clock synchronization algorithm. After initialization, members of the group can periodically synchronize their clocks using a clock synchronization algorithm (described in more detail later). Between synchronization times, a client clock can drift based on its drift rat, dr, (dC/dt for clock C, a drift can be positive or negative).

As a result of this step, the new group member can convert any group clock timestamp into a local clock timestamp and vice versa. We discuss additional details on group clock synchronization further below.

The data chunks sent by the server to its clients include a consumption timestamp (CS), a (potentially) future time when the data frames composing the chunk are to be consumed by the client. In a different embodiment, consumption timestamps could be sent in different channels and include the data chunk ID or the data frame ID for later matching.

When a client receives a chunk of data, it converts the server's tagged consumption timestamp into a local consumption timestamp based on the client's clock drift rate (see Eq. A below). If the local consumption timestamp is in the future relative to the client's clock, the client waits to consume the data chunk until its clock reaches a time greater than or equal to the consumption timestamp.

Clients acknowledge the reception of every data chunk from the server. The acknowledgement also notifies the server of the arrival time of the chunk or the difference between the consumption and arrival times. As a minor variation the client can, rather than sending a response for every data chunk, send a response only when a data chunk arrives after the consumption time, indicating the arrival time or, again, the difference between the consumption timestamp and the arrival time.

In the case that the data chunk arrives after its consumption time has passed, the client can either discard some or all of the data frames included or consume some or all of those data frames at a faster rate until the client local time matches that of the consumption time. Here is a simple illustrative example: if the data chunk is composed of a single video frame, with an associated duration of 40 ms, and the data arrives 10 ms after the consumption time, the client can still consume the data if it reduces the frame duration to 30 ms.

However, for certain applications, the late arrival of data may be a sufficient condition for discarding it.

Another way to convert from group time to local time is to calculate drift:

$$\text{drift} = (LCTS1 - LCTS0)/(GCTS1 - GCTS0) \quad \text{(Eq. AA)}$$

Use drift to convert from GCTS to LCTS $$LCTSk = \text{drift} \times (GCTSk - GCTS1) + LCTS1 \quad \text{(Eq. BB)}$$

LCTS: Local Timestamp
GCTS: Group Timestamp
GCTS1 is the Group Timestamp at the time of last synchronization.
LCTS1 is the Local Timestamp at the time of last synchronization.

Trading Data Quality, Latency, and Synchronization

Embodiments of the invention leverage the fact that some types of data are still useful even when the data is incomplete or approximated. To explain what we mean by incomplete or approximated data, we provide a few examples:

A video or a sound can be encoded at a lower bitrate to produce an approximation of the original video or sound.

An image can be encoded at a lower resolution to produce an approximation of the original image.

A series of measurements can be approximated by removing a random sampling of data points or by rounding each data point to a lower precision.

Sacrificing Data Quality/Completeness to Preserve Synchronization

Some consumers may consistently receive data chunks after the consumption time, e.g. due to a slow network connection. Embodiments of the invention use data approximation and compression, as described above, to preserve the ability to perform synchronized data consumption for all group members, even when network conditions are much worse for some group members than for others. When a client consistently receives data chunks after the consumption time, it can notify the server and request smaller chunks. The server can then provide smaller data chunks to that client while still providing the full data to other clients. The smaller data chunks represent an approximation of the original data to that client while still providing the full data to other clients.

The server may offer multiple levels of data approximation or compression. Some clients may be able to receive full-size chunks before their consumption time, some may be able to receive slightly smaller chunks (close approximations of the original data) before the consumption time, while other clients may only be able to receive very rough approximations of the data before consumption time.

Regardless of the extent of approximation or compression, all clients in the synchronized group are provided the same consumption timestamp by the server. This guarantees that all clients consume the data at the same time, even if some clients are only consuming an approximation of the data and other clients are consuming the complete, original data.

Sacrificing Latency to Preserve Data Quality/Completeness

For some applications, it may be undesirable or impractical to consume approximated data. In these cases, the synchronized group can be configured such that the data sources always provide data that is above some quality threshold, e.g. video bitrate above 2.5 Mbits per second.

Because the server receives responses from the clients with information about the arrival time of the data chunks, it sees which clients are receiving data chunks late, after the arrival time. If the group is configured to preserve data quality/completeness, the server can assign later consumption timestamps to future outgoing data. This results in a higher latency for the group data consumption. That is, the data chunks are consumed after a longer time period has elapsed. However, it allows the group to preserve synchronization as well as data quality.

Inferring the Consumption Time when it is not Explicitly Provided

The consumption timestamp associated with a data chunk can be seen as the consumption time for the first frame of the data chunk. The consumption time of all subsequent data frames can be computed based on the consumption time of the first frame and each frame timestamp. For example, consider a series of 3 video frames, Frame 0 through Frame 2. Suppose that only Frame 0 has an explicit group consumption timestamp (GCTS) of 150,000. Frame 1, which does not have an explicit consumption timestamp, has a video timestamp that is 3,750 ticks after the video timestamp of Frame 0.

Thus, Frame 1's GCTS is inferred to be 150,000+3,750=153,750. This timestamp is expressed in terms of the group clock and must be converted to the consumer's local clock. Note that if the client's local clock has a drift relative to the group clock, then Frame 1's consumption timestamp in local time will be more (if drift >1) or less (if drift <1) than 3750 ticks on the local clock. This means that the client's playback rate is effectively different than the group playback rate to stay in synchronization.

Detailed Discussion of Clock Synchronization

Embodiments of the invention rely on a clock synchronization phase. We now describe one clock synchronization algorithm, based on Cristian's time synchronization algorithm (https://en.wikipedia.org/wiki/Cristian %27s_algorithm), that could be used to satisfy the present invention. A client C contacts a time server S requesting the server's time. After receiving the request, the server prepares a response and appends its time T (which may or may not be set based on an external source such as UTC). After receiving the reply, the client sets its time to be T+RTT/2, where RTT stands for the roundtrip time of the communication. Alternatively, rather than setting its local clock to server time, the client can simply make note of the offset between the group clock and the local clock. To achieve a tighter synchronization, the client can perform this request multiple times and use the response with the shortest RTT. The described method assumes that the RTT is evenly split between request and response. Different embodiments of the invention could utilize any number of different clock synchronization algorithms. The only requirement is that, after the algorithm is complete, the group member must be able to convert between group timestamps and local timestamps. Other synchronization algorithms that satisfy this requirement include but are not limited to Berkeley and NTP. Given that the present invention does not require synchronization with an external clock, depending on the application, several other algorithms could be used in their place.

By performing a clock synchronization algorithm twice, the client can calculate the drift rate between its local clock and the group clock.

Given the importance of the group clock, the synchronization group can increase its resilience by maintaining one or more backup group clocks, which are kept synchronized with the primary group clock. In the event of a failure of the primary group clock, the group can quickly promote one of the backup group clocks to serve as the new primary group clock selected using any leader election algorithm.

DESCRIPTION OF FIGURES

Figure 1:
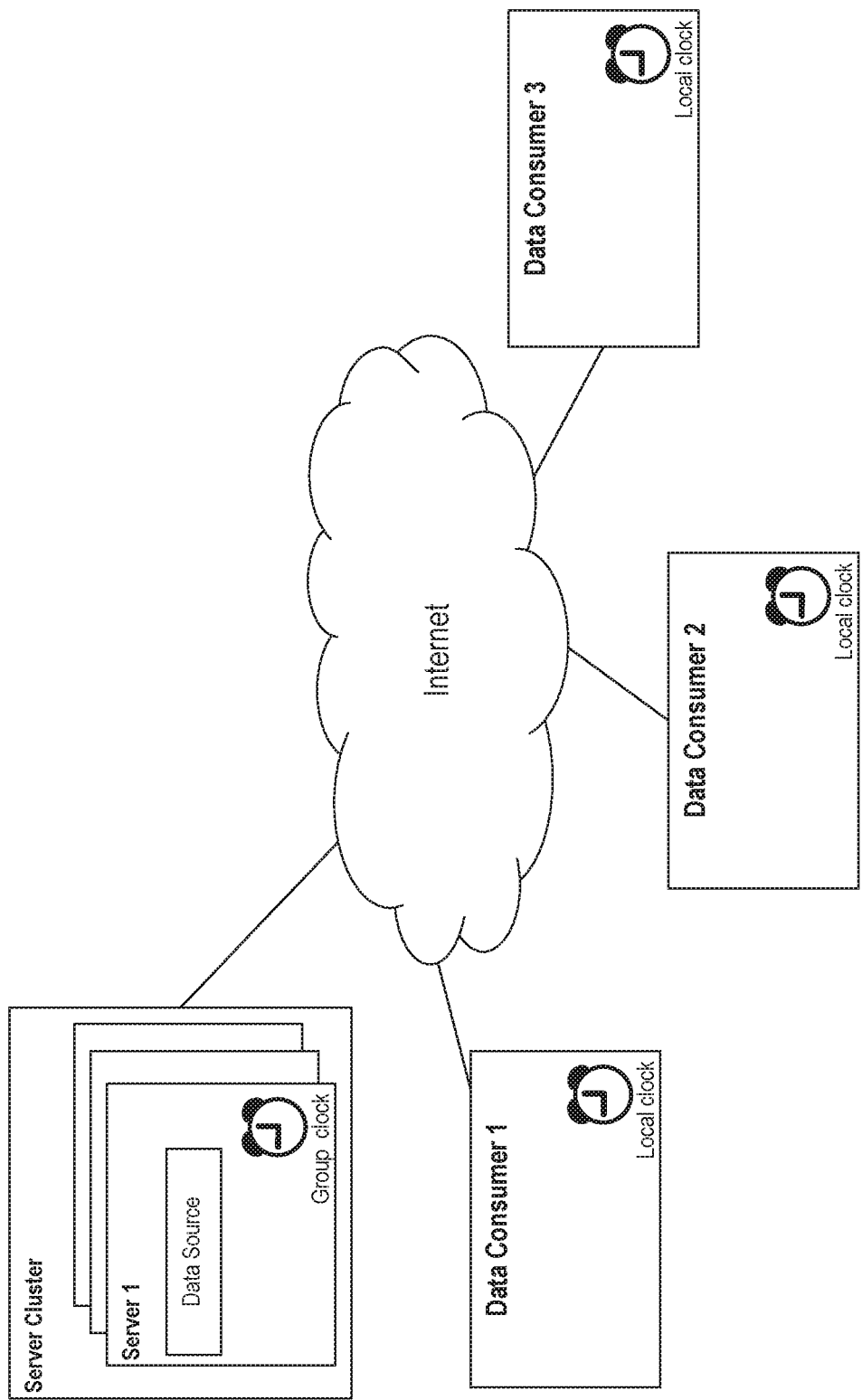
FIG. 1 is a block diagram showing an exemplary synchronization group according to the invention.

FIG. 1 is a block diagram showing an exemplary synchronization group according to the invention. In an exemplary embodiment of the invention, a server sends data chunks, which could be composed of one or more frames, with an added consumption time (CT). Upon receiving a data chunk with time CT, a client i with local time LCi either buffers the chunk's frames, plays them immediately, or discards a subset of them, i.e. part of the chunk, depending on the difference between LCi and CT.

FIG. 2 shows an example of a single-frame data chunk and a multi-frame data chunk. The invention could be implemented using only single-frame data chunks, only multi-frame data chunks, or a combination of single-frame data chunks and multi-frame data chunks.

Figure 3:
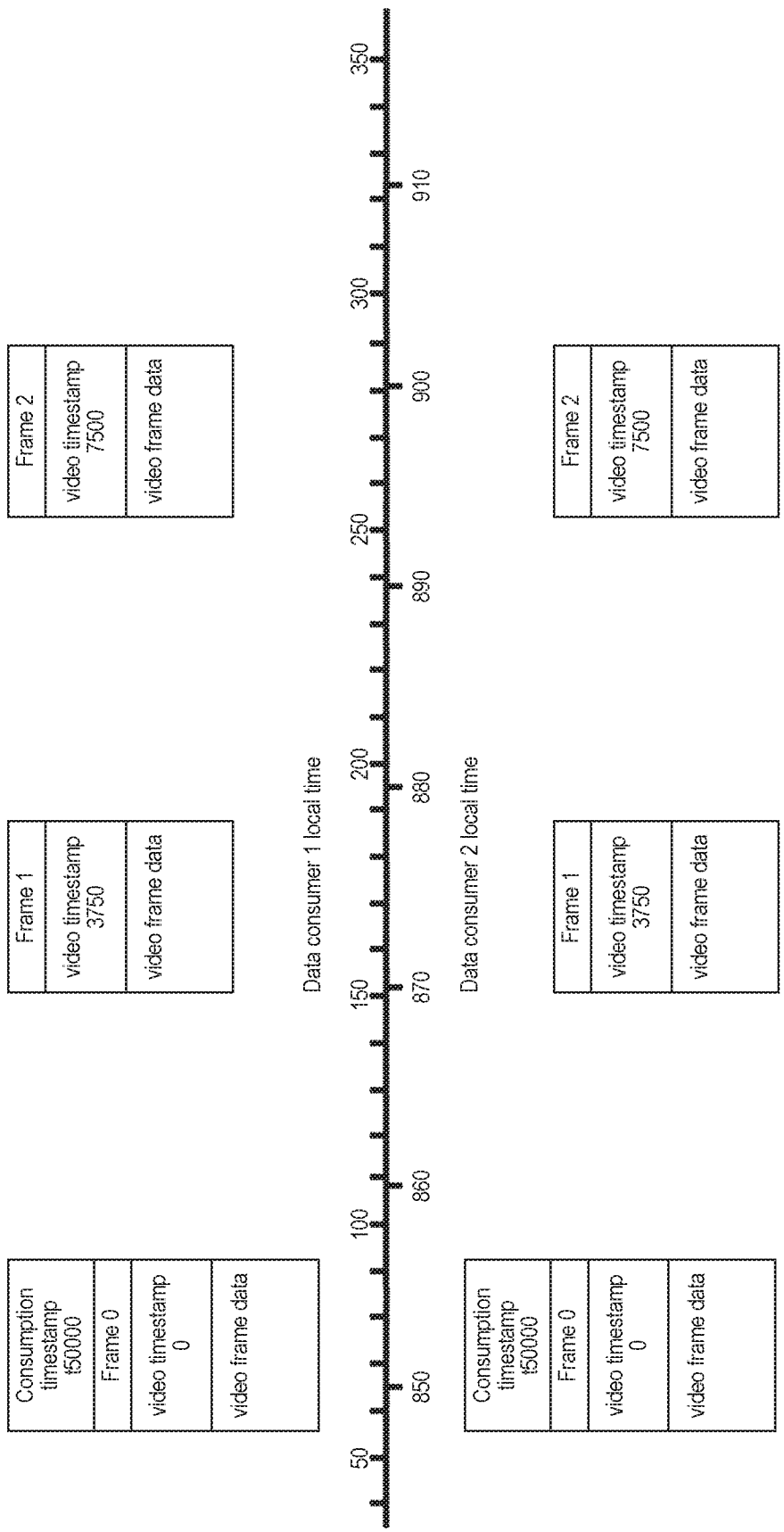
FIG. 3 is a timing diagram showing frame synchronization for two consumers according to the invention.

FIG. 3 is a timing diagram showing frame synchronization for two consumers according to the invention. This FIG. illustrates that two consumers have distinct local clocks, but are still able to consume data in synchronization at a given group time. A more detailed timing diagram and explanation is provided in FIG. 19.

Figure 4:
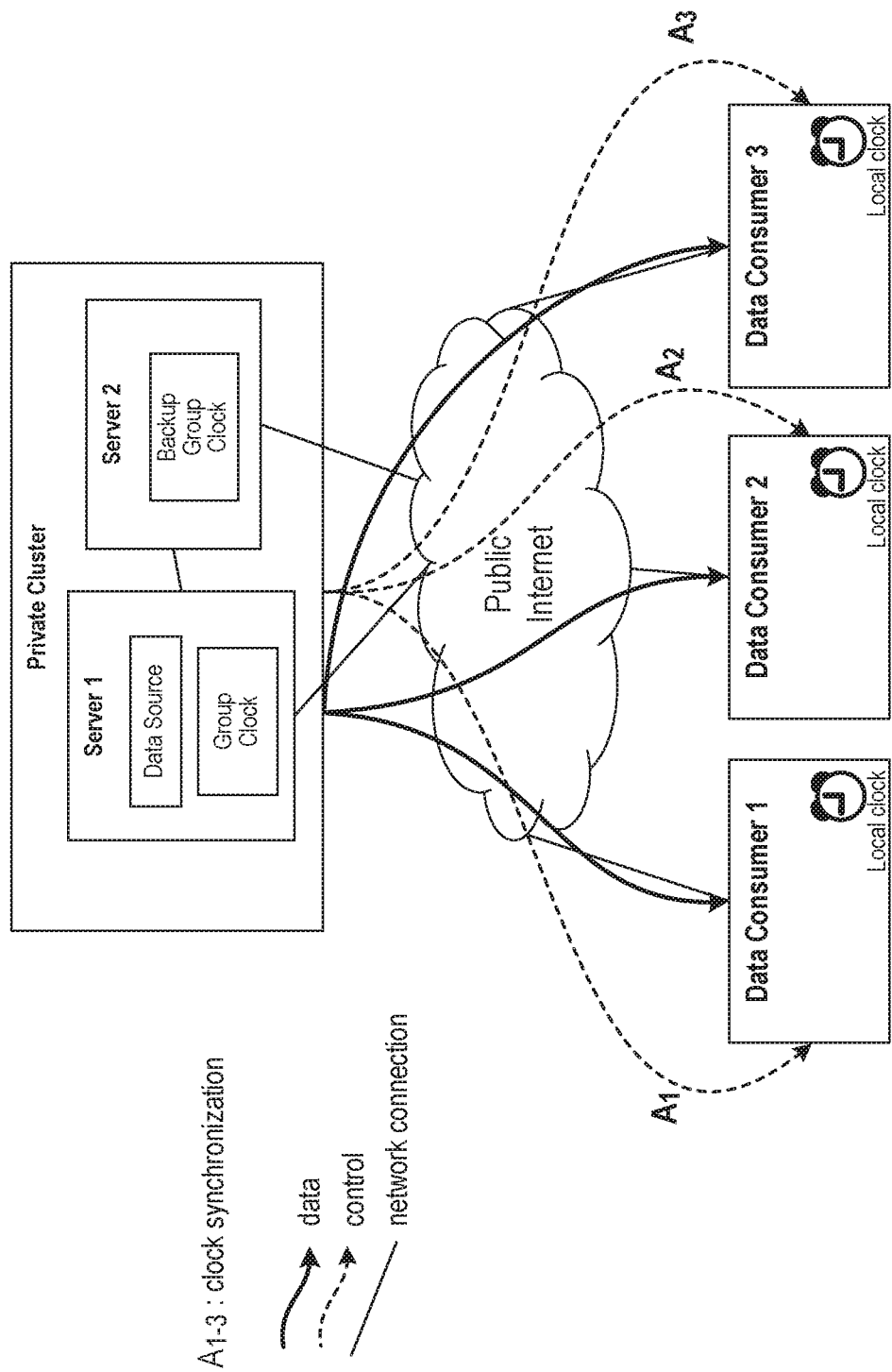
FIGS. 4-6 show system architecture according to the invention.
Figure 5:
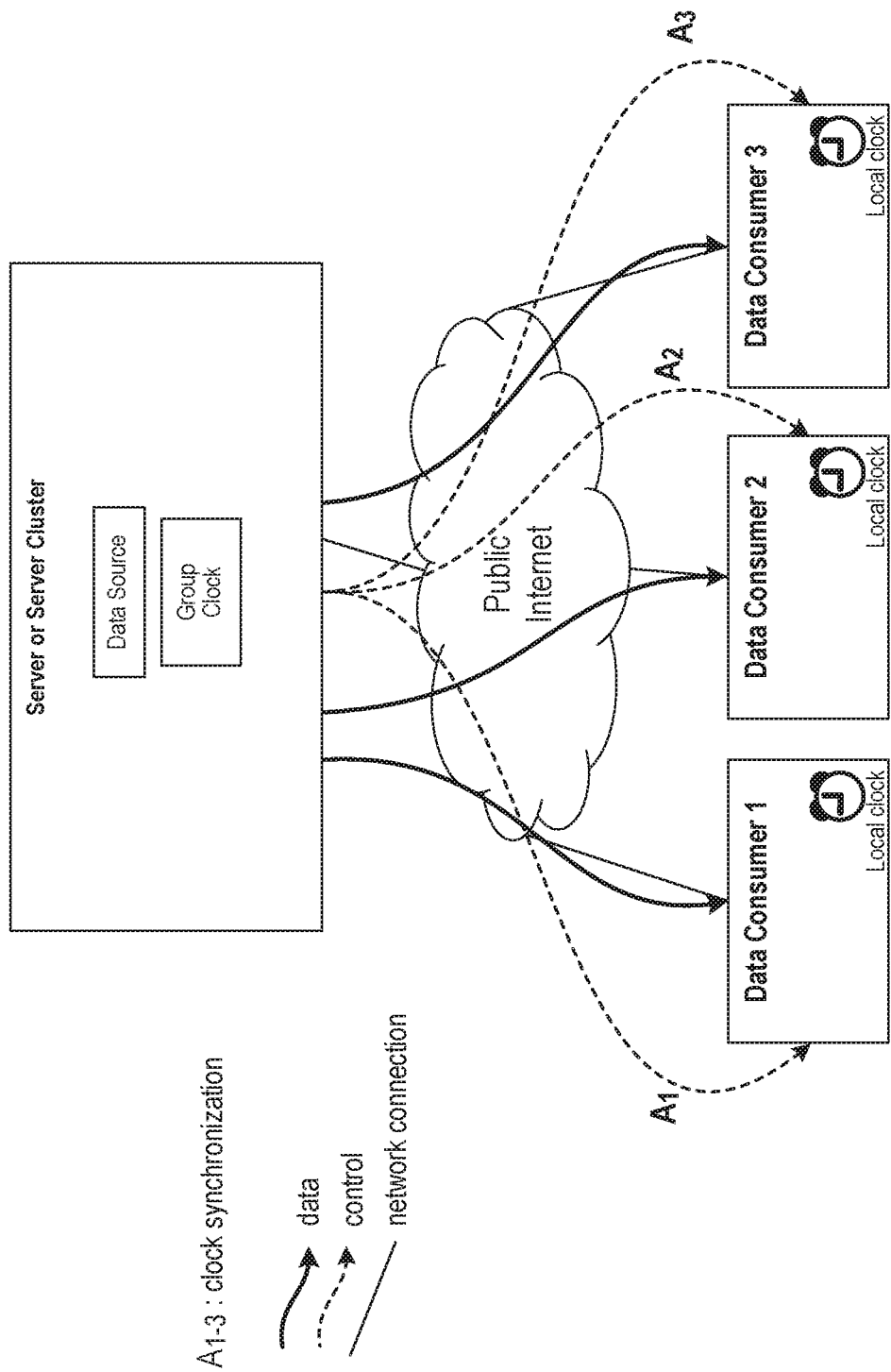
Figure 6:
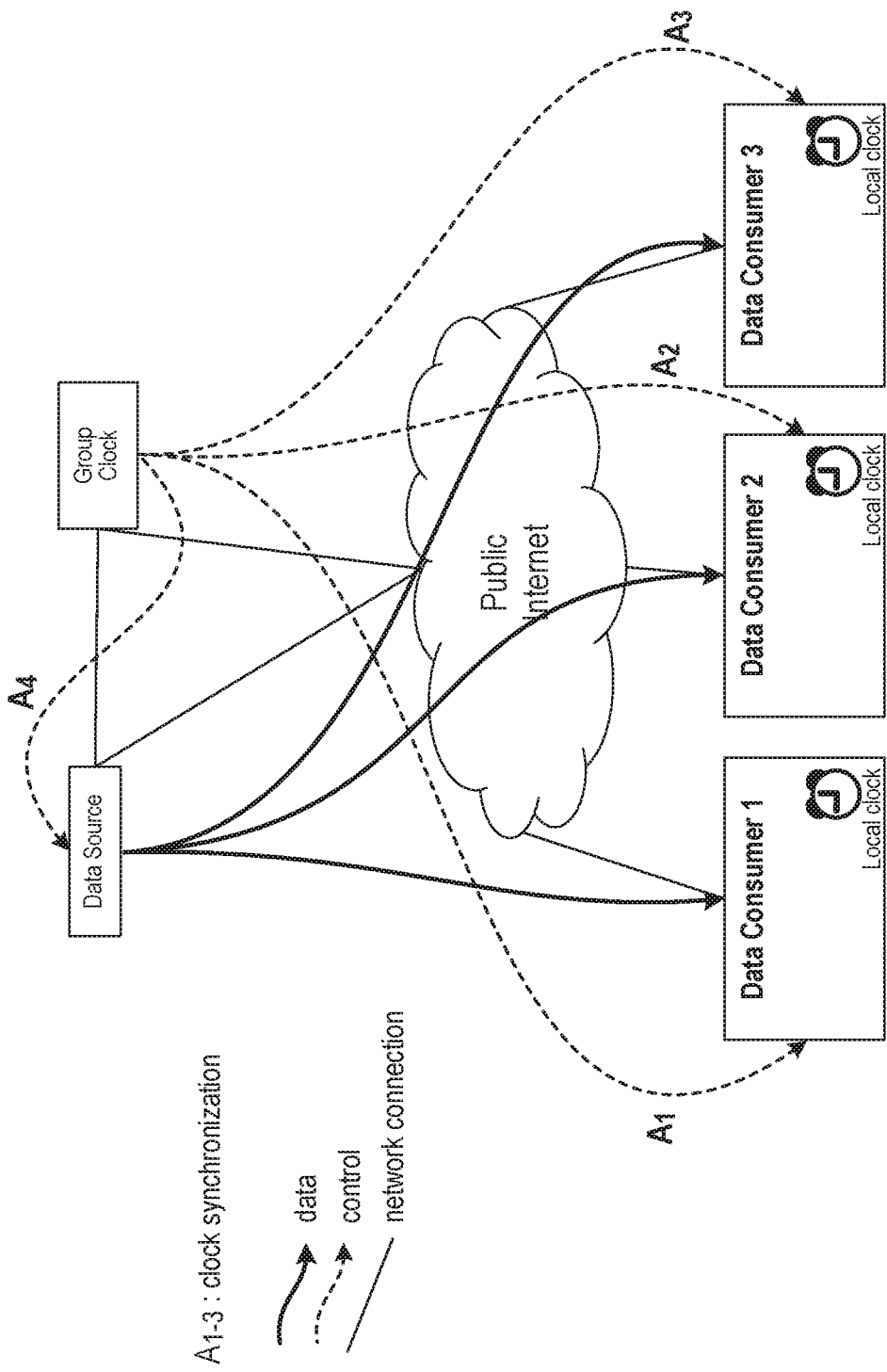

FIGS. 4-6 show system architecture according to the invention.

FIG. 4 shows an example architecture with two servers in a private cluster. Server 1 acts as a data source, from which data will be sent to various consumers. Server 1 also has a clock that serves as the group clock in this example architecture. Server 2 is also part of the private cluster and maintains a backup group clock. The backup group clock is maintained in synchronization with Server 1's group clock so that if Server 1's group clock fails, Server 2's clock can be quickly promoted to act as the group clock. Data Consumers 1-3 are connected to the private cluster via the public internet. Each consumer has its own local clock. Each consumer periodically performs a synchronization algorithm with the group clock, the result of such algorithm is that the consumers are able to convert from group time to their own local time and from local time to group time. Server 1 sends data to each consumer over the public internet along with consumption timestamps that are associated with the data. The consumers receive the data and use the consumption timestamps to consume the data in synchronization.

FIG. 5 is the same as FIG. 4 except that the following details have been removed:
We do not show which server acts as the data source. This is because, in practice, any one server could act as the data source or multiple servers could jointly act as data sources.
We do not show which server holds the group clock because any server could hold the group clock.
We do not show a backup clock because the backup clock is not necessary.

FIG. 6 is the same as FIG. 4 except we show the data source and group clock as totally separate boxes, connected via the public internet. This is to illustrate that the group clock does not need to be collocated with the data source. The data source could have its own local clock, which it would synchronize with the group clock.

FIGS. 7-19 show a session, through its multiple steps, with clients joining, synchronizing their clocks, and consuming data published by the source according to the invention.

Figure 7:
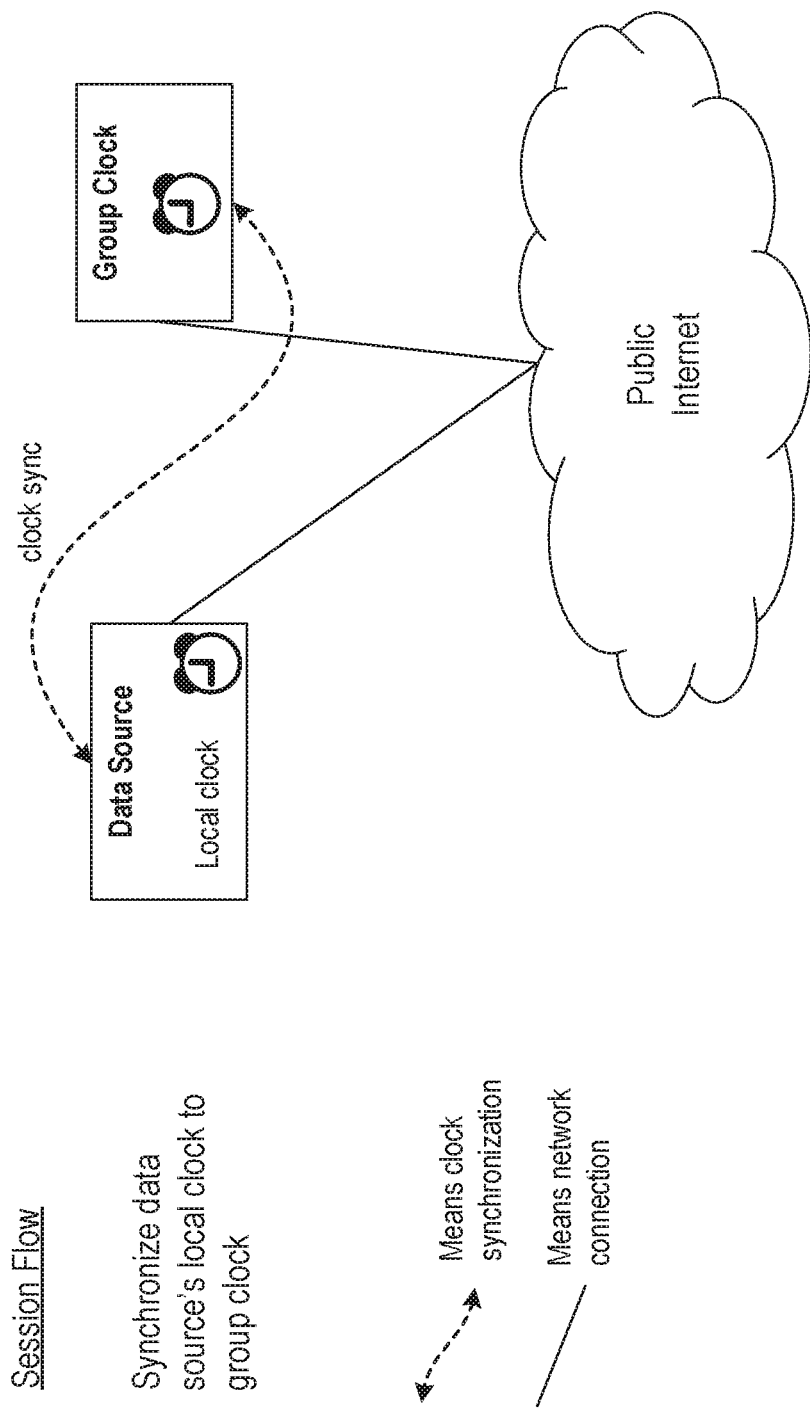
FIG. 7 shows the data source performing the synchronization step.

FIG. 7 shows the data source performing the synchronization step. This may be necessary if the group clock is distinct from the data source's local clock. This allows the data source to convert from group time to its own local time and from local time to group time.

Figure 8:
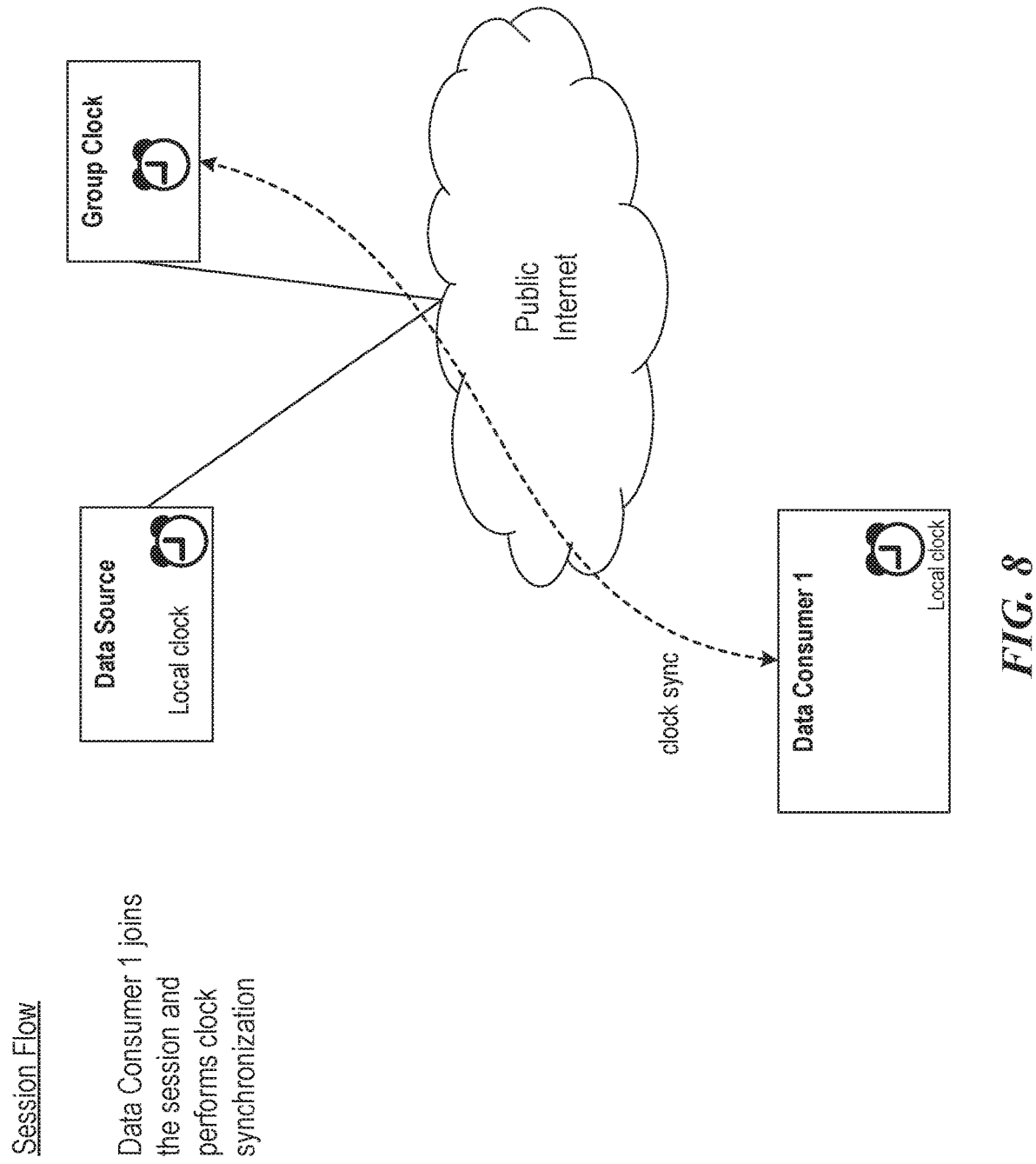
FIG. 8 shows a consumer joining the session and performing the clock synchronization step.

FIG. 8 shows a consumer joining the session and performing the clock synchronization step. This allows the consumer to convert from group time to its own local time and from local time to group time.

Figure 9:
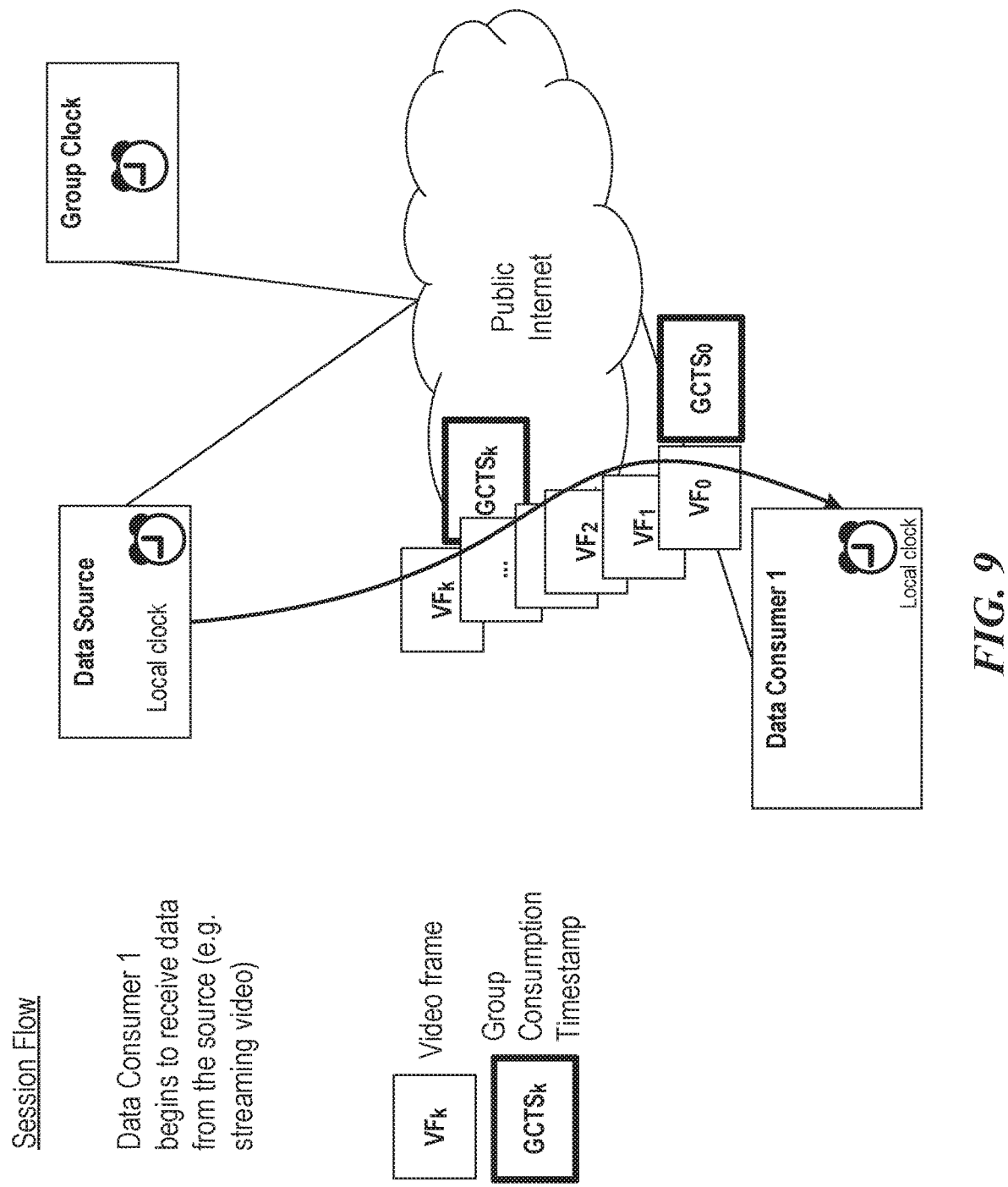
FIG. 9 shows the data source sending data over the public internet to the consumer.

FIG. 9 shows the data source sending data over the public internet to the consumer. In this example, the data being sent is video data, composed of Video Frames (labeled as VF in the figure). The data source also sends Group Consumption Timestamps (labeled as GCTS in the figure) which are associated with certain video frames. In this example, each video frame also has a video timestamp so not every video frame needs a GCTS. FIG. 9 also illustrates that the GCTS can be sent separately from the data to which it pertains. The GCTS is expressed in terms of the group clock. The GCTS will be converted to a Local Consumption Timestamp (LCTS), which is expressed in terms of the consumer's local clock.

Figure 10:
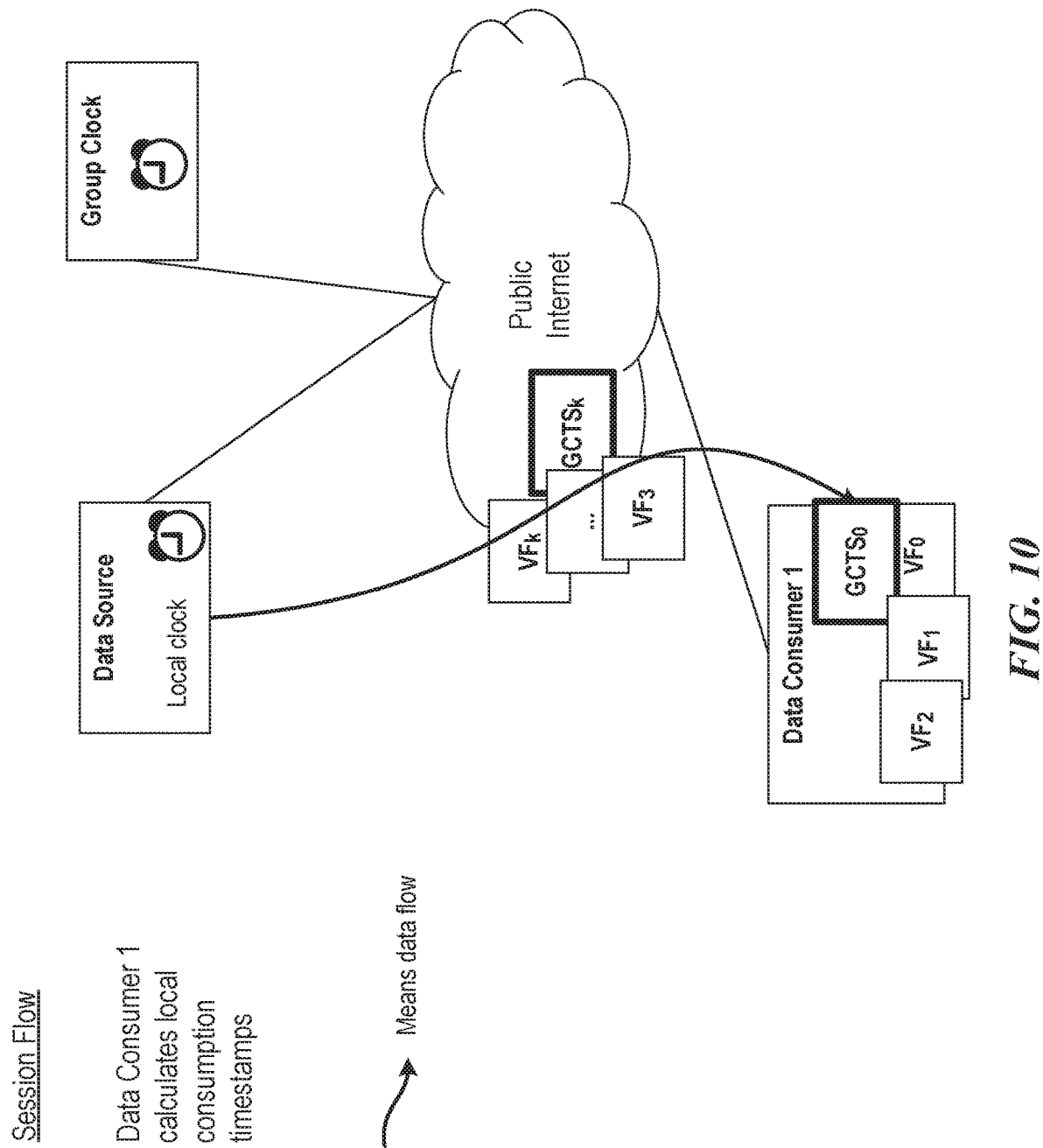
FIG. 10 shows that some of the data has arrived at the consumer.

FIG. 10 shows that some of the data has arrived at the consumer. The consumer will be responsible for calculating the Local Consumption Timestamps (LCTS) for each video frame. The subsequent FIGS. show this in more detail.

Figure 11:
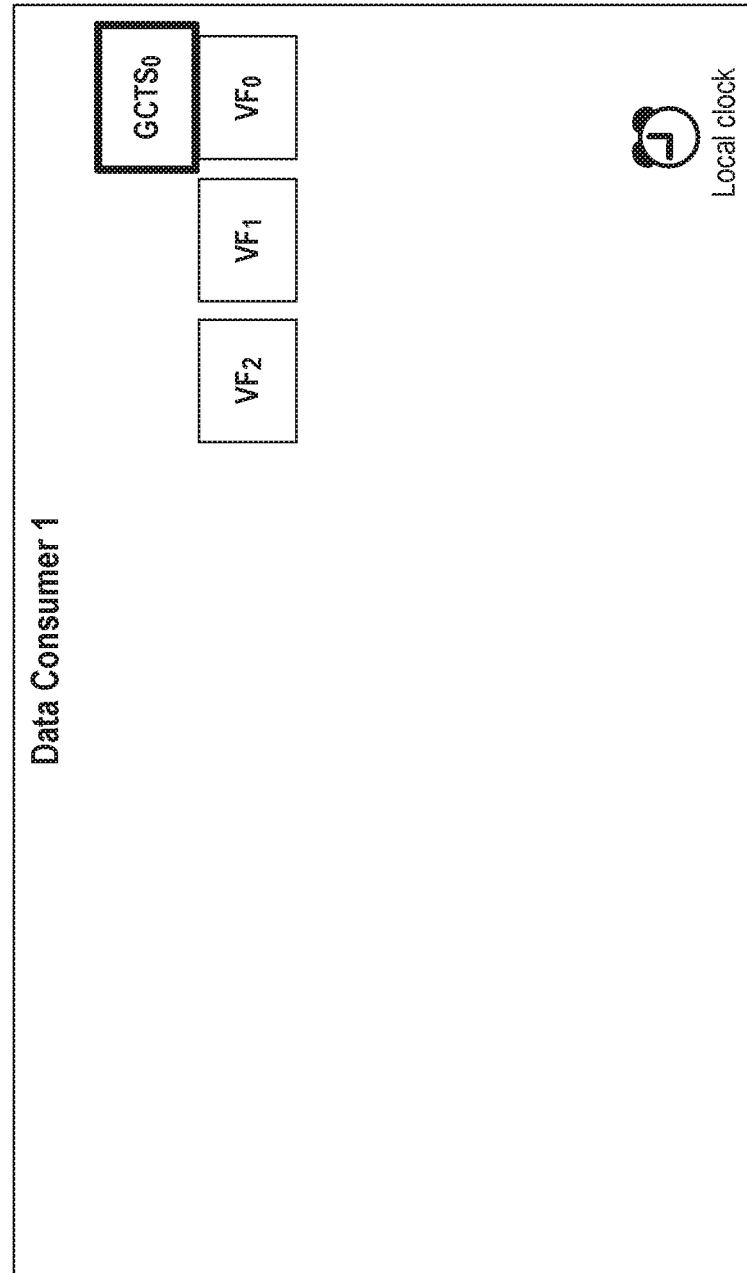
FIG. 11 shows a detailed view of the consumer, which has received 3 video frames and 1 Group Consumption Timestamps (GCTS).

FIG. 11 shows a detailed view of the consumer, which has received 3 video frames and 1 GCTS.

Figure 12:
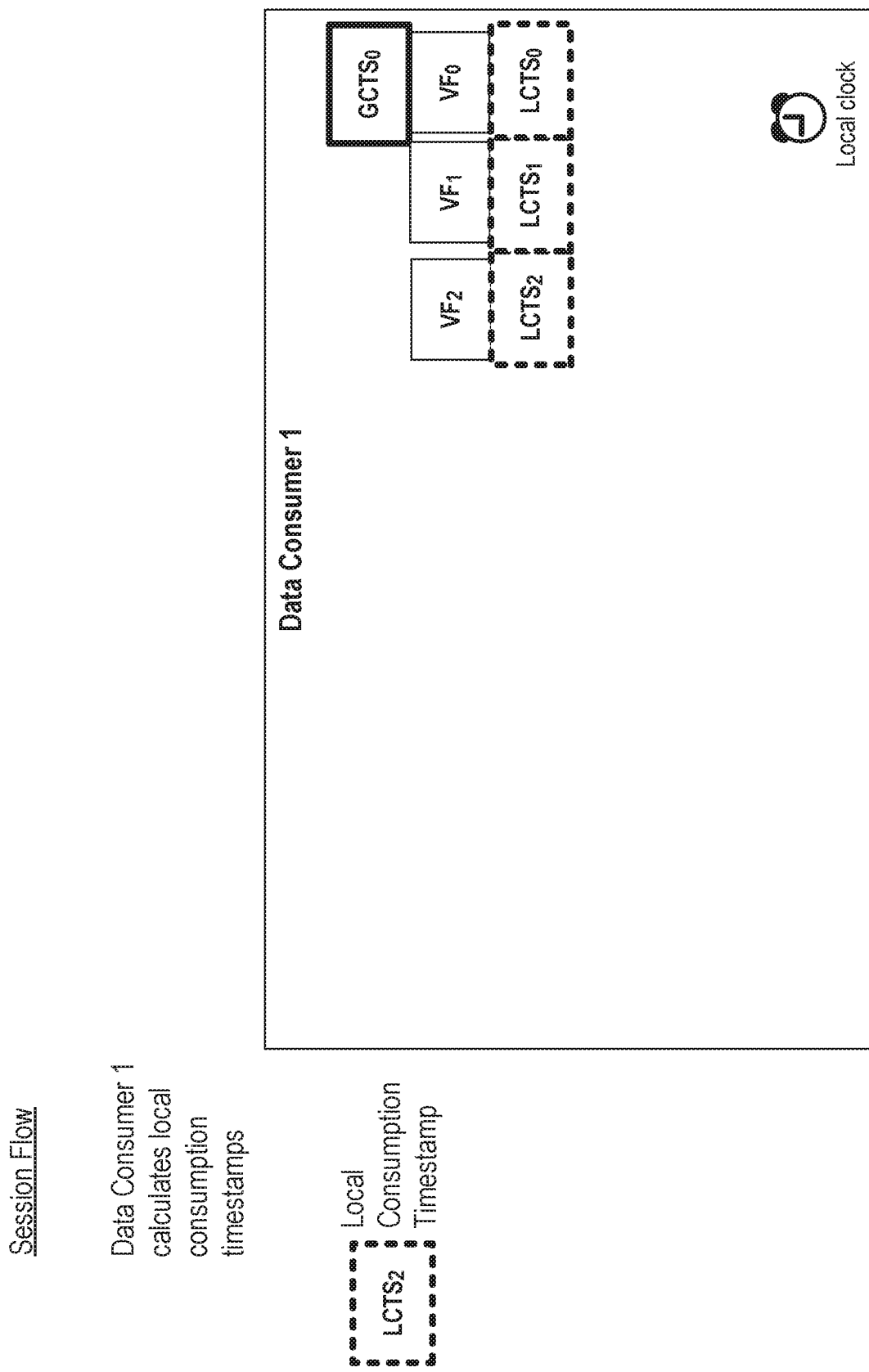
FIG. 12 shows that the consumer has calculated Local Consumption Timestamps for each video frame (LCTS).

FIG. 12 shows that the consumer has calculated Local Consumption Timestamps for each video frame. LCTS0 is calculated directly from GCTS0. LCTS1 and LCTS2 are calculated in two steps. First, the duration information associated with each video frame is used to infer the GCTS for that frame. Second, the GCTS is converted to an LCTS as usual. For example, if the video frame rate is 24 frames per second, then the client can infer that GCTS1=GCTS0+ $\frac{1}{24}$ seconds. The client can then convert GCTS1 to LCTS1 as usual.

Figure 13:
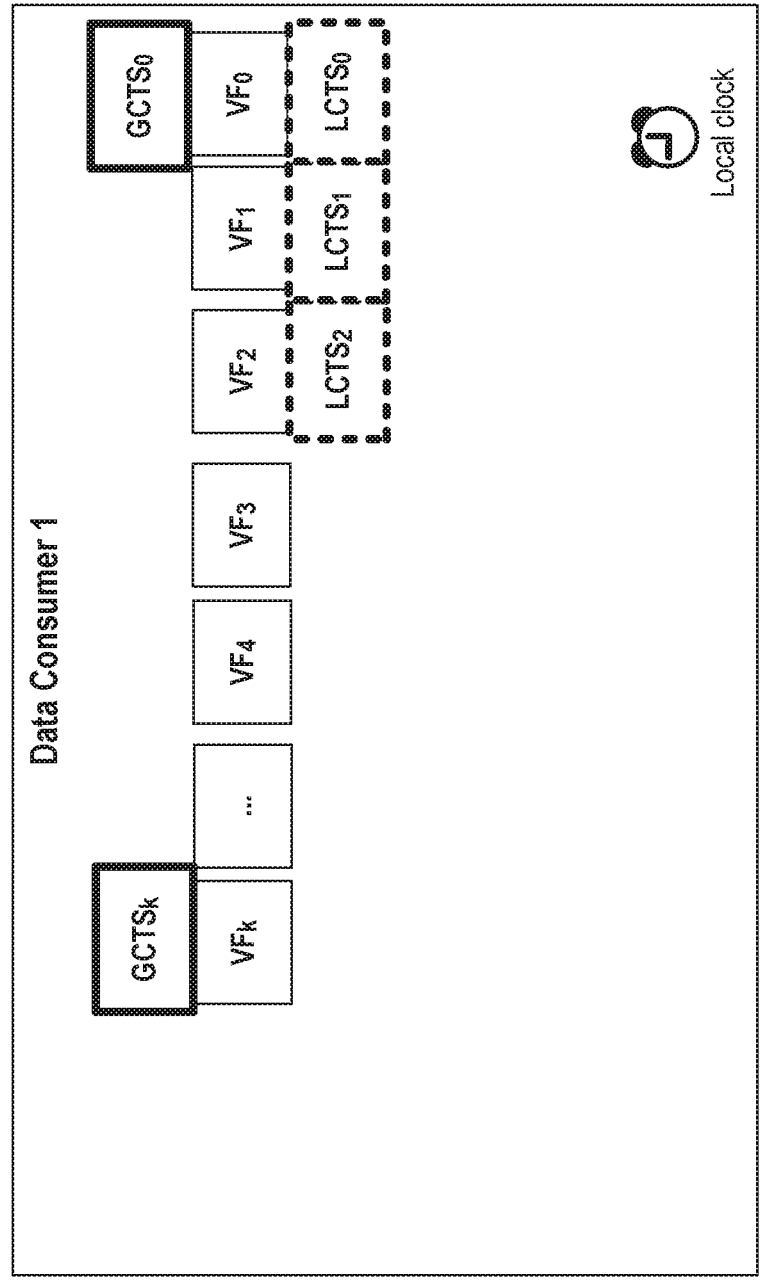
FIG. 13 shows that more data has arrived at the consumer.

FIG. 13 shows that more data has arrived at the consumer. Namely, more video frames and another GCTS have arrived.

Figure 14:
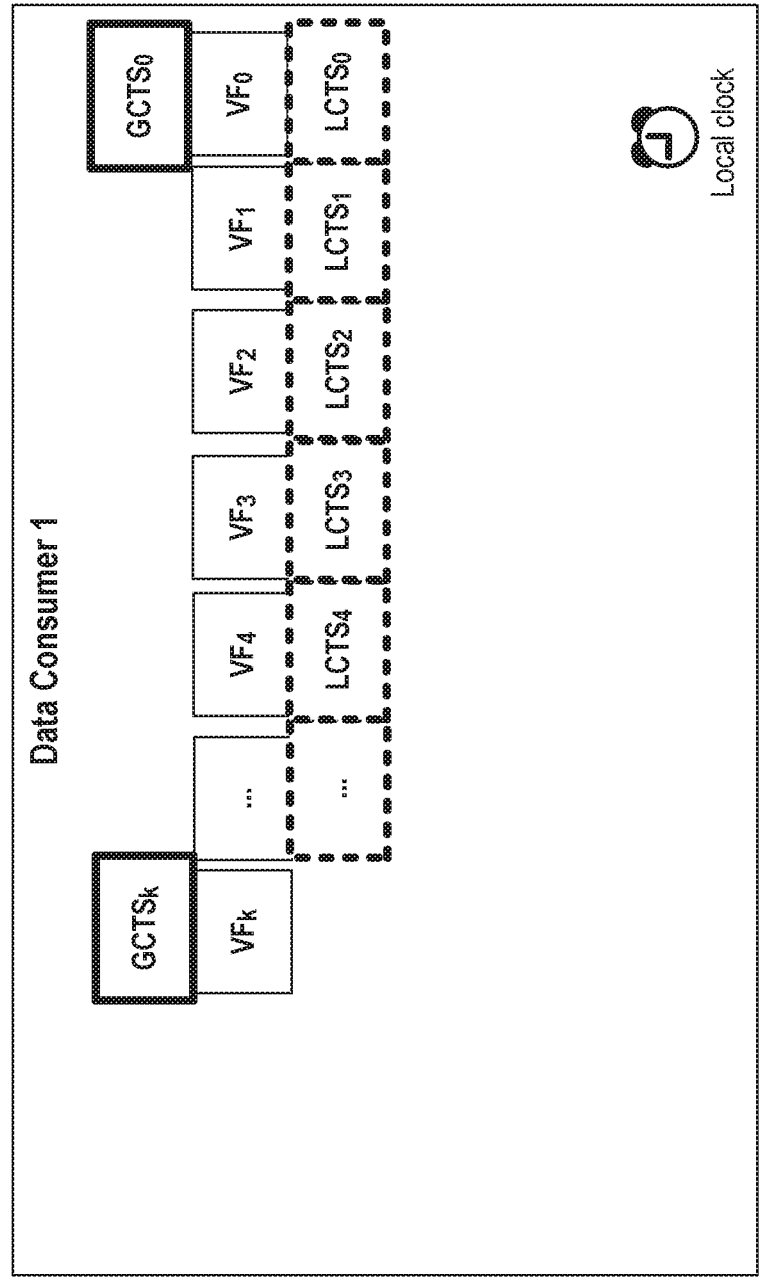
FIG. 14 shows that the consumer has calculated LCTS3 and LCTS4.

FIG. 14 shows that the consumer has calculated LCTS3 and LCTS4. These LCTSs are calculated using the two-step method described in the FIG. 12 description. This FIG. also illustrates that an arbitrary number of additional LCTSs have been calculated as shown by the box labeled " . . . "

Figure 15:
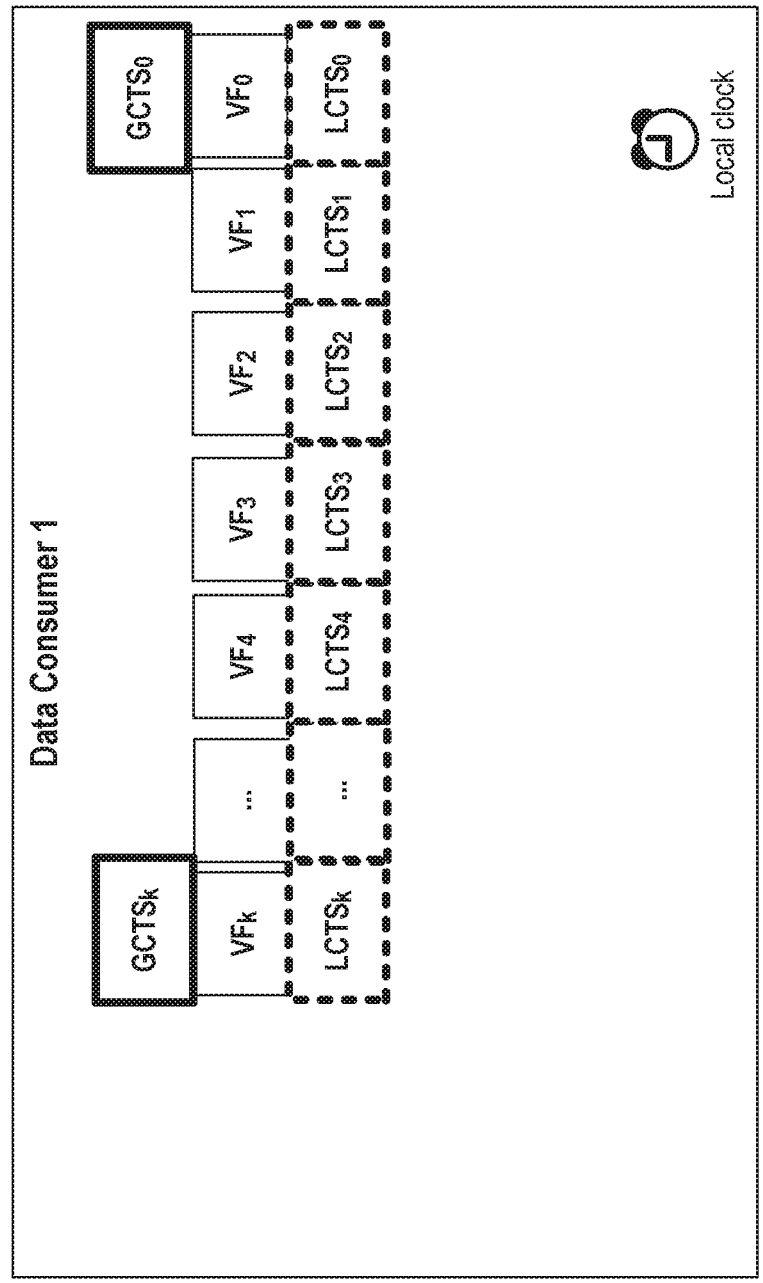
FIG. 15 shows that LCTSk has been calculated. LCTSk can be calculated directly from GCTSk, which has been provided by the data source.

FIG. 15 shows that LCTSk has been calculated. LCTSk can be calculated directly from GCTSk, which has been provided by the data source.

Figure 16:
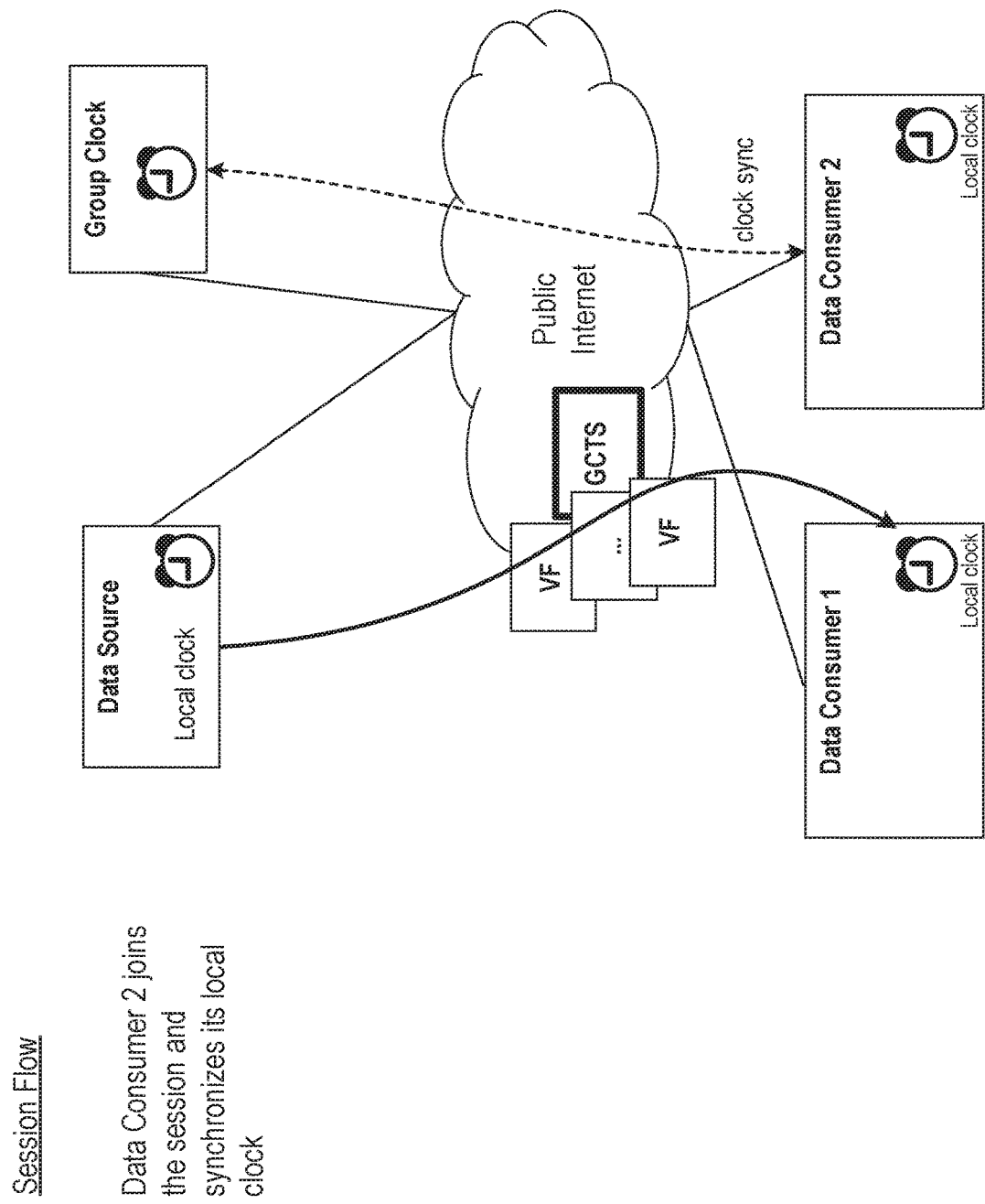
FIG. 16 shows that a second consumer, Data Consumer 2 has joined the session.

FIG. 16 shows that a second consumer, Data Consumer 2 has joined the session. Data Consumer 2 performs the synchronization step. Meanwhile, Data Consumer 1 continues to receive data from the data source.

Figure 17:
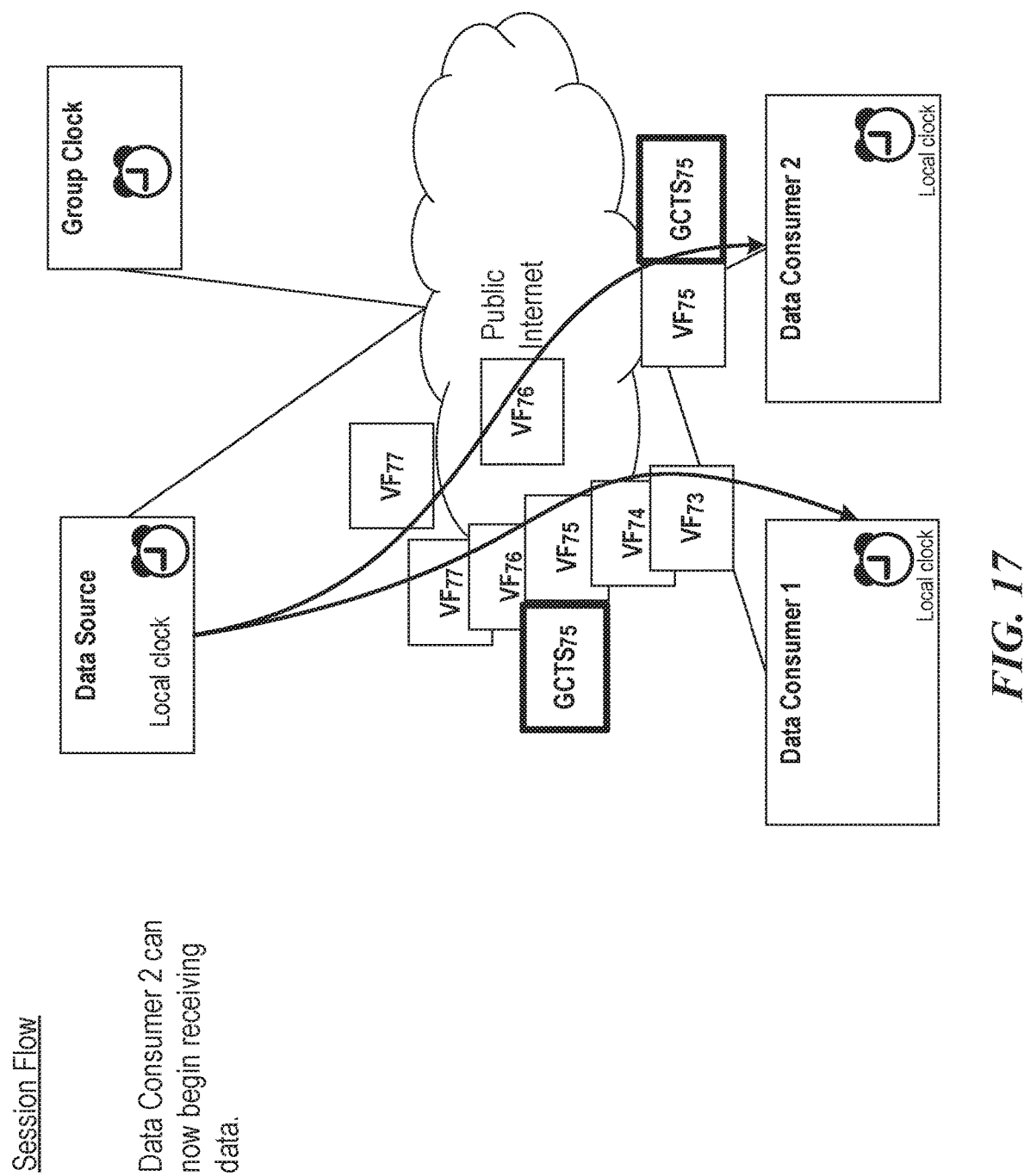
FIG. 17 shows that Data Consumer 2 begins receiving the same data that Data Consumer 1 is receiving.

FIG. 17 shows that Data Consumer 2 begins receiving the same data that Data Consumer 1 is receiving. The FIG. illustrates that the data may arrive sooner or later at Data Consumer 2 than it arrives at Data Consumer 1. As soon as Data Consumer 2 receives a Group Consumption Timestamp and the corresponding data (e.g. GCTS75 and VF75), it can begin to consume data in synchronization with the rest of the group. In the context of streaming video, this step is analogous to a person walking into a movie theater in the middle of a movie.

Figure 18:
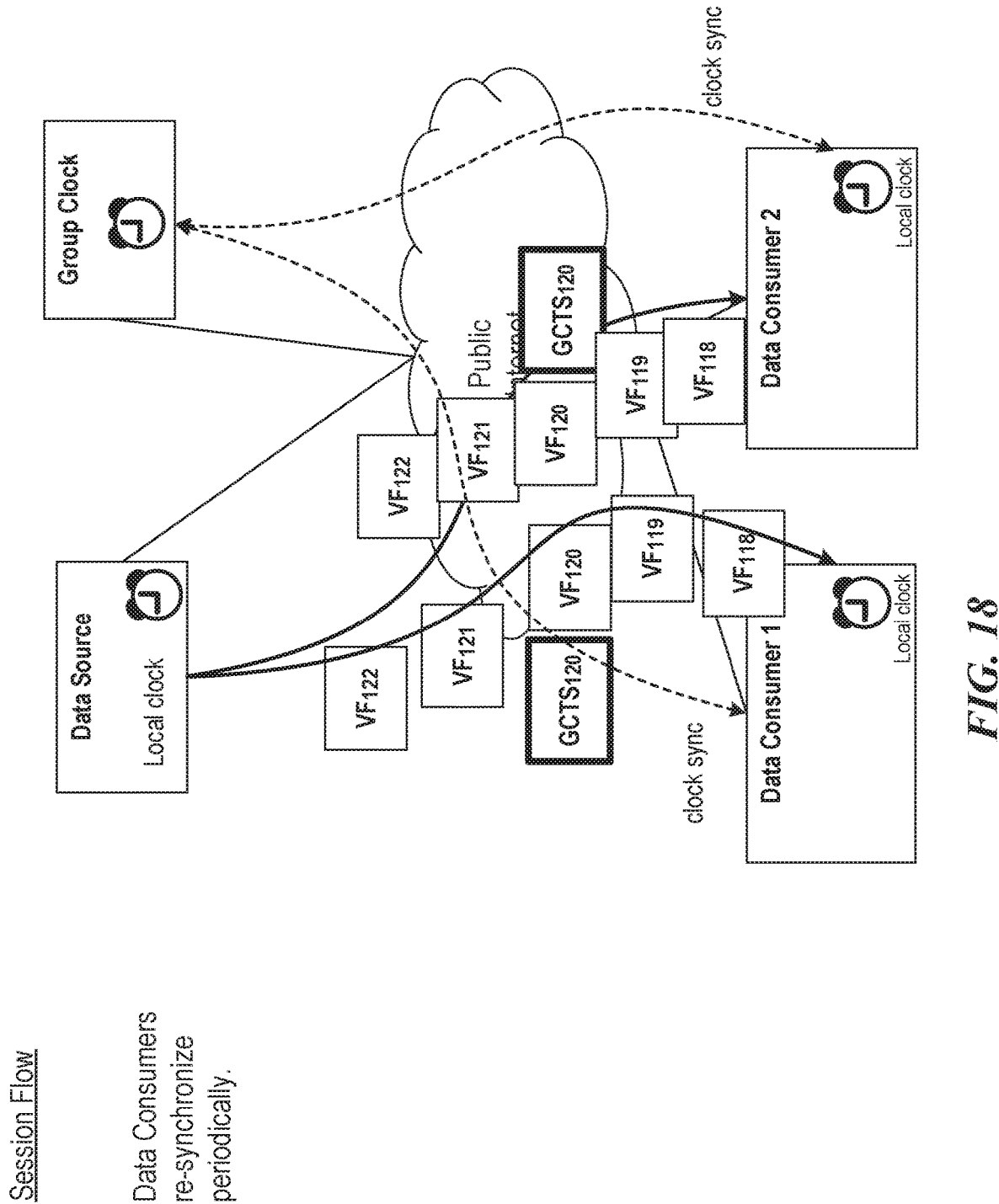
FIG. 18 shows that the consumers periodically repeat the clock synchronization step.

FIG. 18 shows that the consumers periodically repeat the clock synchronization step. Since the drift between clocks might change over time, periodically recalculating the drift will ensure a tighter synchronization of consumption. The re-synchronization does not need to be performed by all group members at the same time. A consumer can continue to consume data while performing re-synchronization. If the data source has its own local clock, it should also periodically repeat the synchronization step.

Figure 19:
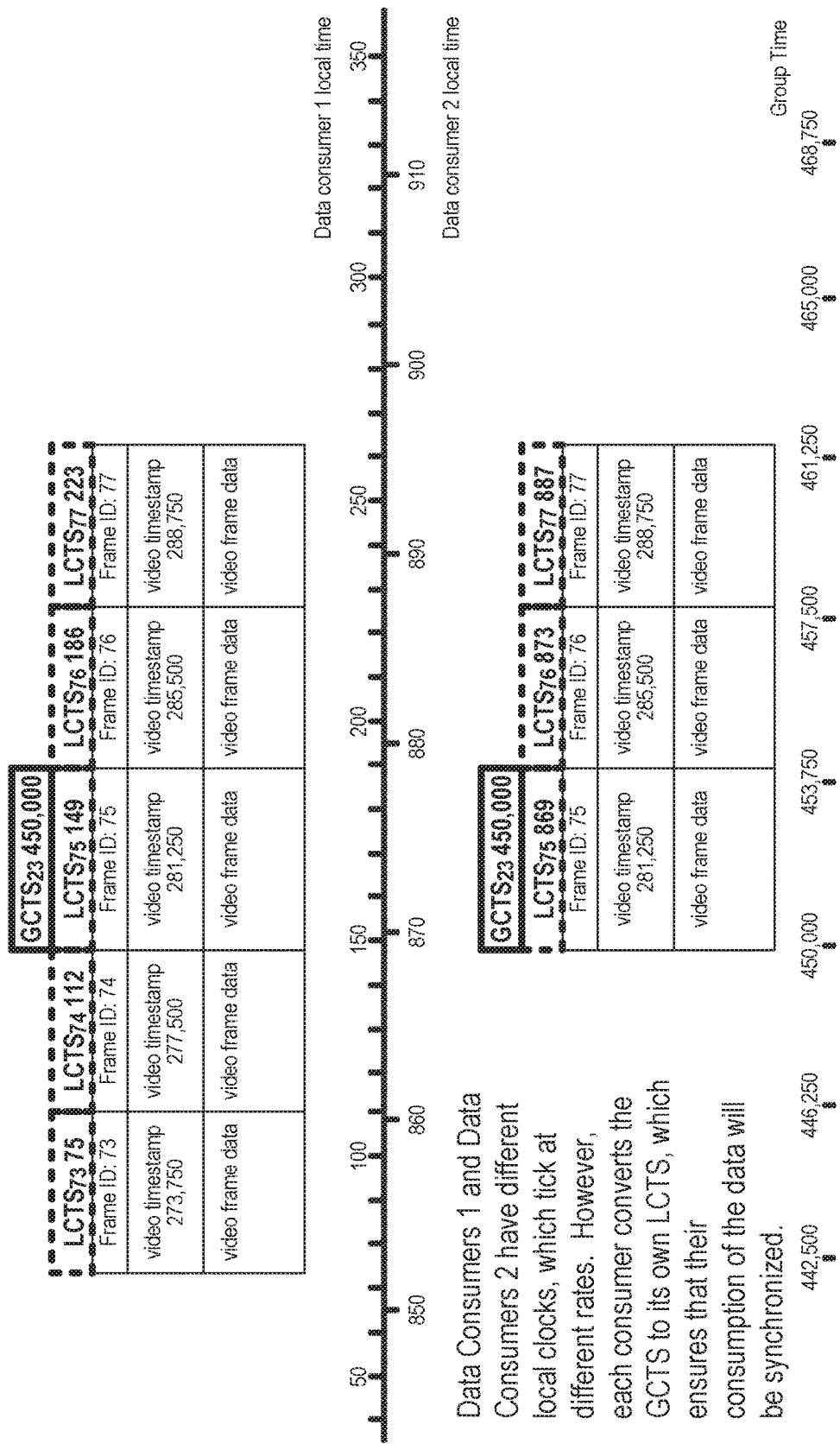
FIG. 19 shows how the data is consumed by Data Consumer 1 and Data Consumer 2 at the same group time (e.g. in synchronization) even though each consumer has its own local clock.

FIG. 19 shows how the data is consumed by Data Consumer 1 and Data Consumer 2 at the same group time (e.g. in synchronization) even though each consumer has its own local clock. In this figure, the data being consumed is video. The frame rate is 24 frames per second, and the video time base is 90 kHz. Thus, the number of clock ticks per video frame is 90,000/24=3,750. In this example, the local clocks of the consumers are deliberately unrealistic to illustrate that a group member does not need an accurate clock in order to participate in the synchronization group. For every tick of the group clock, Data Consumer 1's clock ticks 0.0099 times. At group time=450,000, the offset between Data Consumer 1's clock and the group clock is 449,851. For every tick of the group clock, Data Consumer 2's clock ticks approximately 0.0024 times. At group time=450,000, the offset between Data Consumer 2's clock and the group clock is 449,131.

Frame 73 is played at group time=442,500. This is equivalent to local time=75 for Data Consumer 1. Data Consumer 2 has not joined yet.

Frame 74 is played at group time=446,250. This is equivalent to local time=112 for Data Consumer 1. Data Consumer 2 has not joined yet.

Frame 75 is played at group time=450,000. This is equivalent to local time=149 for Data Consumer 1 and equivalent to local time=869 for Data Consumer 2, which has just joined.

Frame 76 is played at group time=453,750. This is equivalent to local time=186 for Data Consumer 1 and equivalent to local time=878 for Data Consumer 2.

Frame 77 is played at group time=457,500. This is equivalent to local time=223 for Data Consumer 1 and equivalent to local time=887 for Data Consumer 2.

Figure 20:
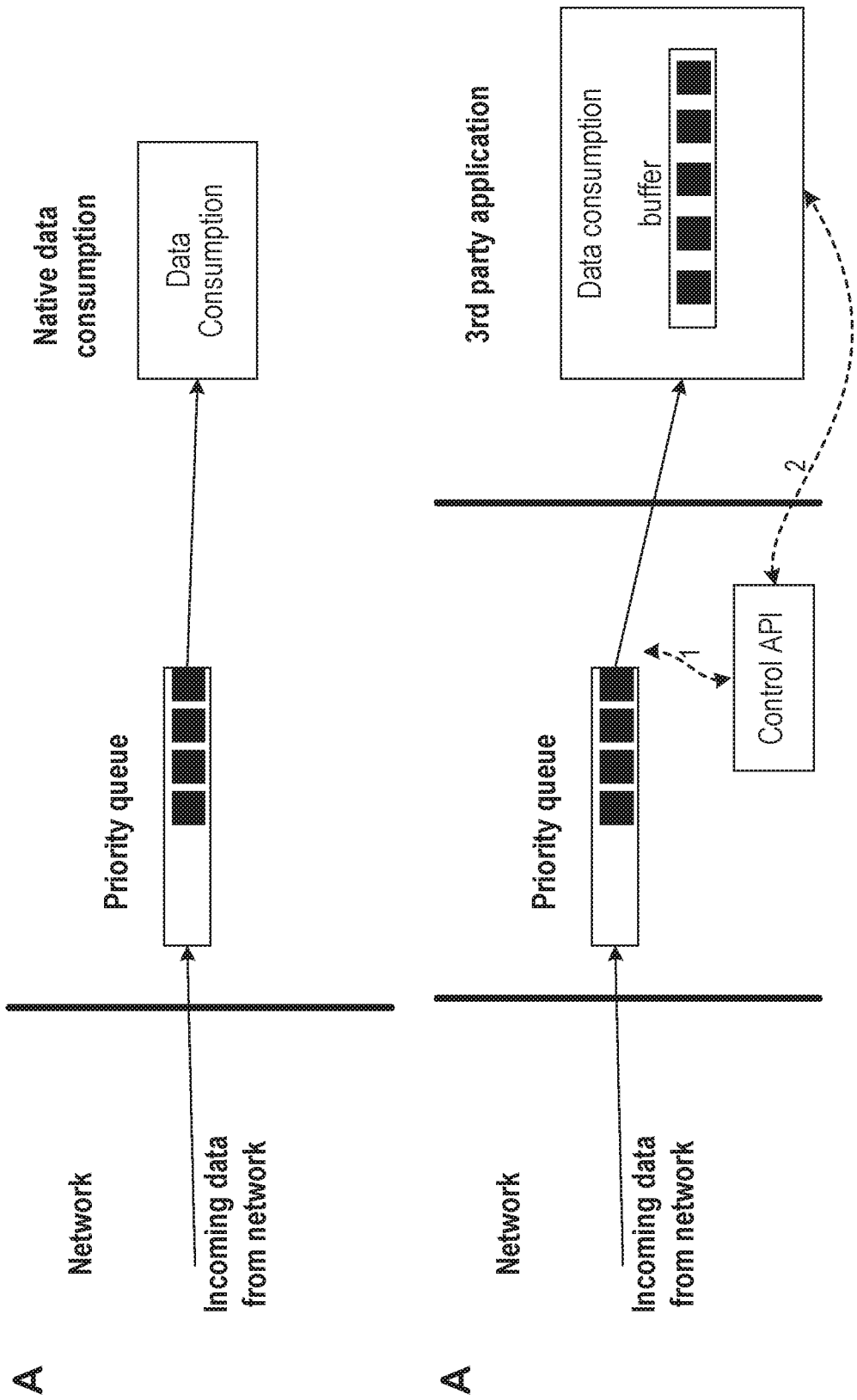
FIG. 20 is a block schematic diagram showing queues and synchronized data consumption according to the invention.

FIG. 20 is a block schematic diagram showing queues and synchronized data consumption according to the invention. Part A of this FIG. shows the data being consumed directly by the client application. In this case, the client application has full control over the consumption timing and method. In the context of video playback, this simply entails rendering a video frame at the desired time.

In part B of FIG. 20, the ultimate consumer of the data is a third-party application. In this case, the client application can still influence the timing of the third-party application's consumption as follows:

1) The client application can control the timing at which it feeds data to the third-party application. It may also drop data frames or send duplicate data frames, which influences the time that subsequent frames are consumed by the third-party application.

2) The third-party application may provide information about its state and accept control inputs. Examples of control inputs are the ability to adjust the third-party application's consumption rate (e.g. video playback rate) as well as the ability to skip data or seek to a certain point in the data stream. The client application can use the information provided by the third-party application to calculate the appropriate control inputs that will result in consumption occurring at the consumption timestamp as desired, thus maintaining synchronization of data consumption.

FIGS. 21A-21H show priority-based ordering of data according to the invention.

Figure 21A:
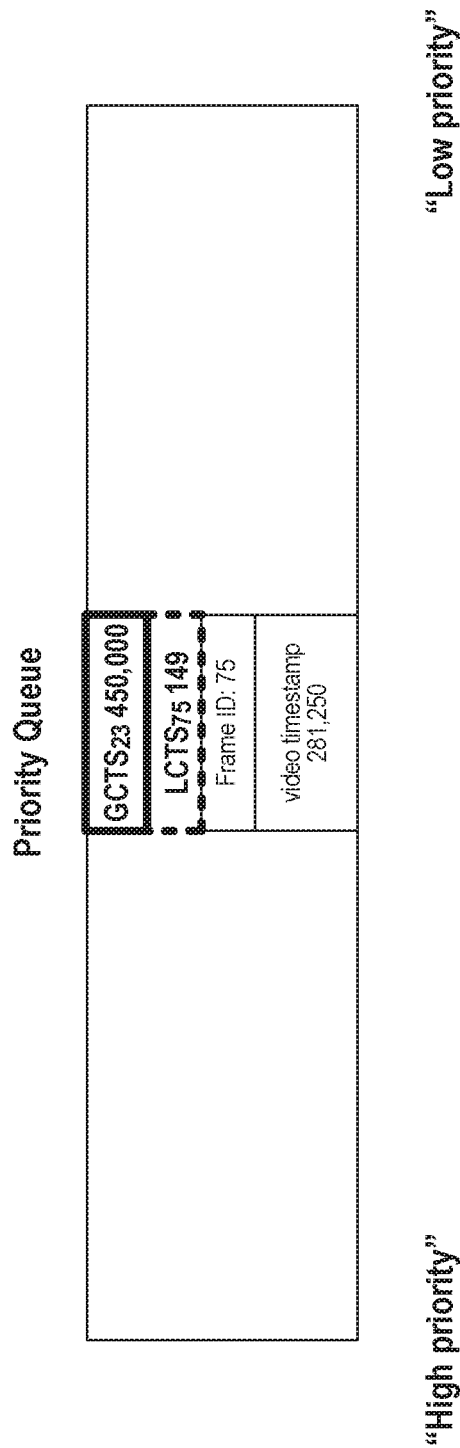

FIG. 21A shows a consumer's priority queue. The consumer maintains a priority queue of data frames based on the local consumption timestamp (and sequence number if provided). Late arriving frames are discarded or consumed at a faster rate, thus allowing the consumer to catch up with the rest of the group. Early arriving chunks are placed in the priority queue. In this figure, the priority queue has one data frame.

Figure 21B:
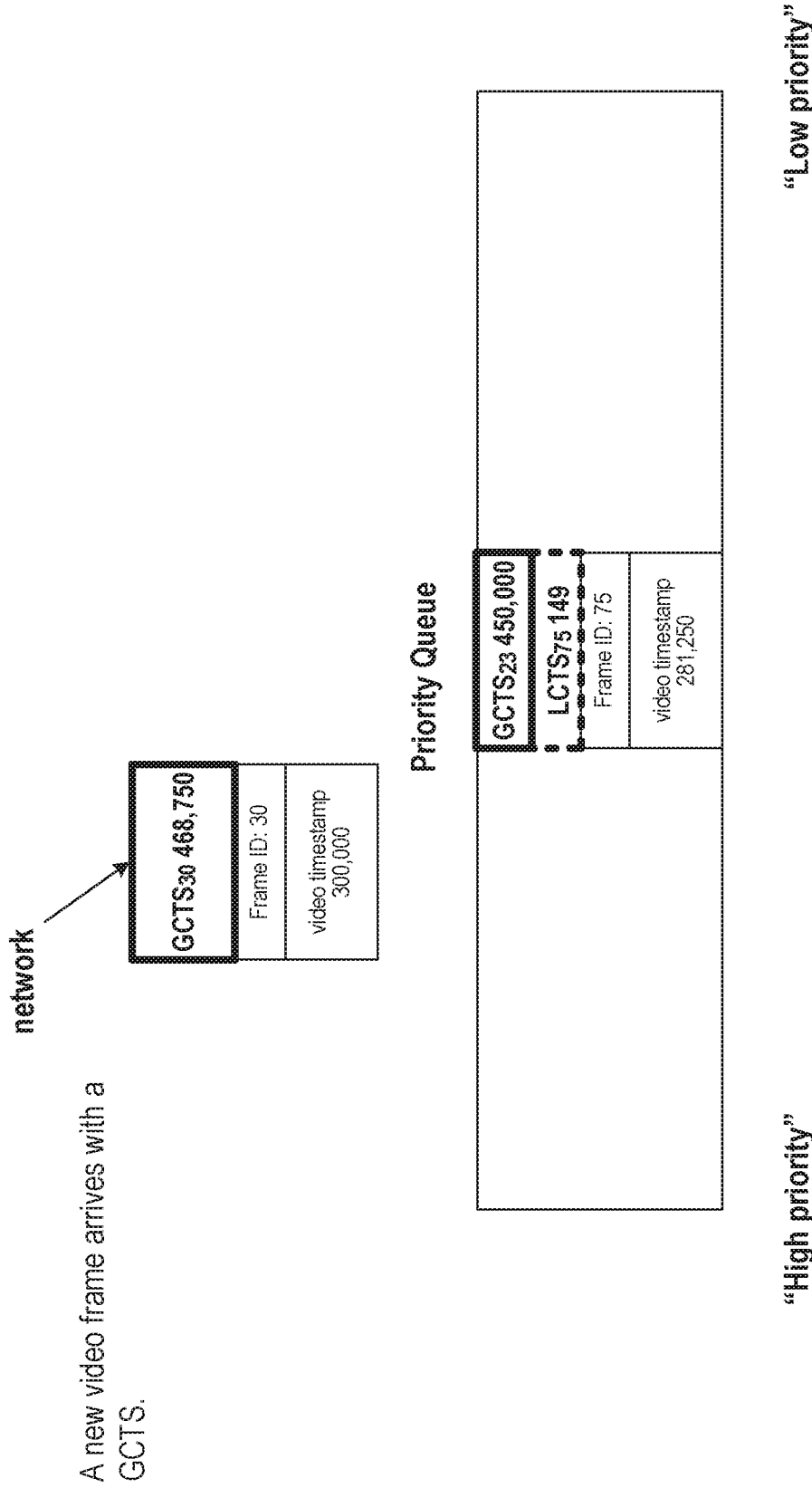

FIG. 21B shows a new piece of data (video frame 80) arriving via the network. The data has an associated Group Consumption Timestamp (GCTS).

Figure 21C:
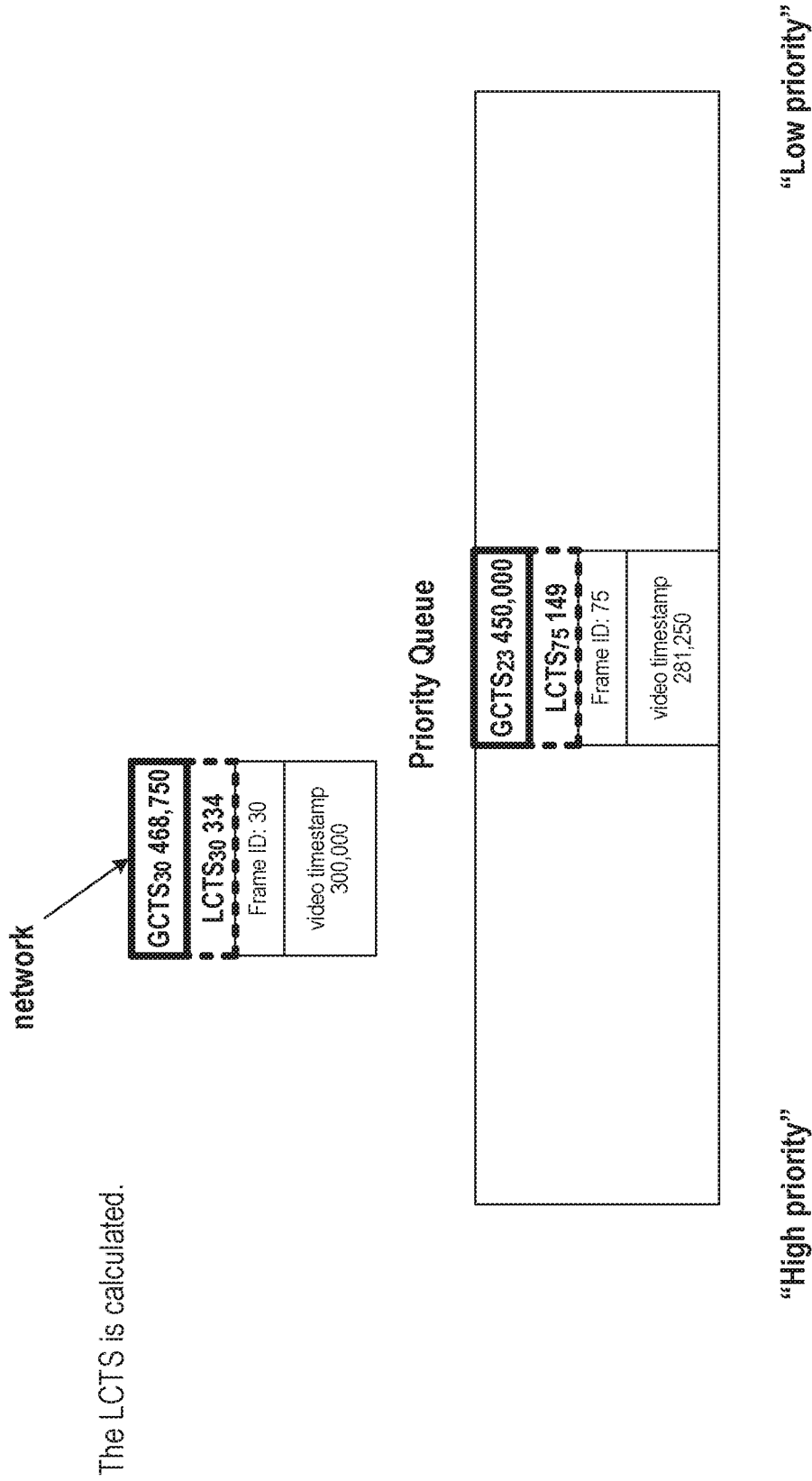

FIG. 21C shows that the consumer has calculated the Local Consumption Timestamp (LCTS) for the new data frame (video frame 80).

Figure 21D:
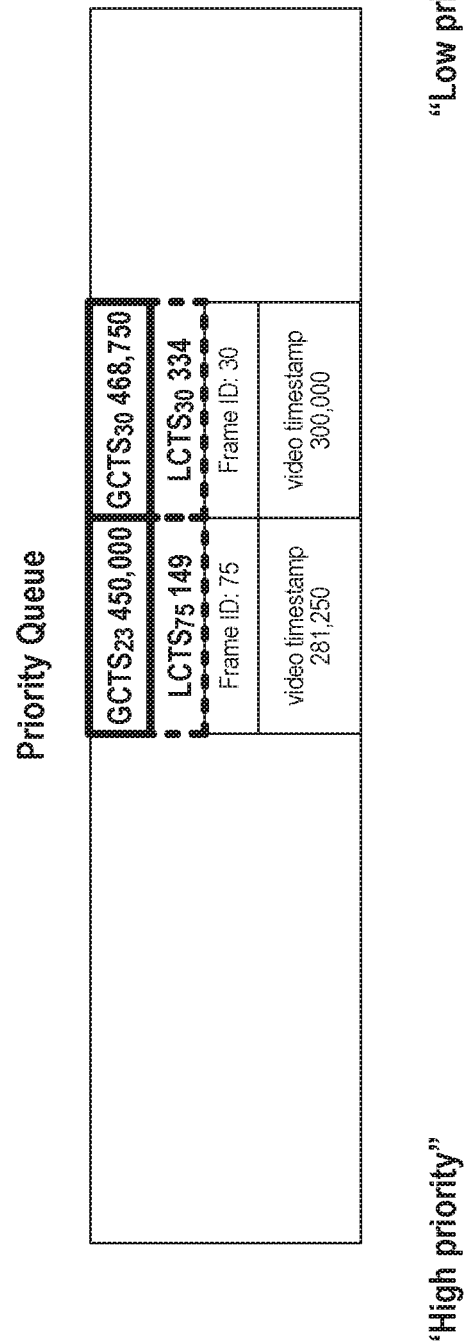

FIG. 21D shows that the new data frame (video frame 80) has been placed in the priority queue, with a lower priority than the existing data frame (video frame 75) because video frame 80 has a later LCTS than video frame 75.

FIG. 21E shows that a new data frame (video frame 76) has arrived from the network. This data frame does not have an explicit GCTS provided.

FIG. 21F shows that the consumer calculates an LCTS for video frame 76. This can be done by comparing the video timestamp of the new frame to the video timestamp of a frame with a known LCTS, and accounting for clock drift.

Figure 21G:
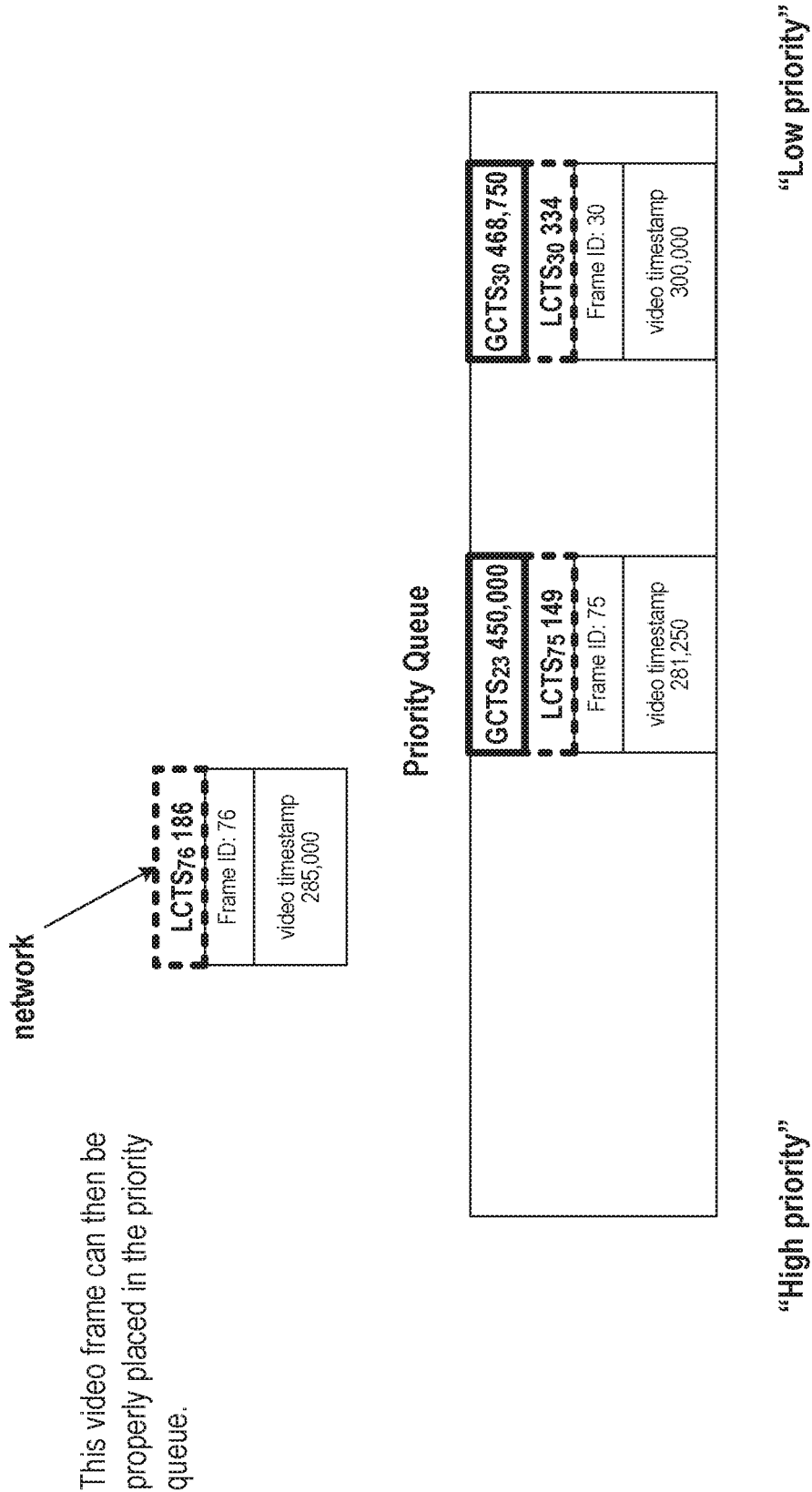

FIG. 21G shows that video frame 76 is about to be placed in the priority queue.

FIG. 21H shows that video frame 76 is placed in the priority queue. It has a higher priority than video frame 80, whose LCTS is later. It has a lower priority than video frame 75, whose LCTS is earlier.

Figure 22:
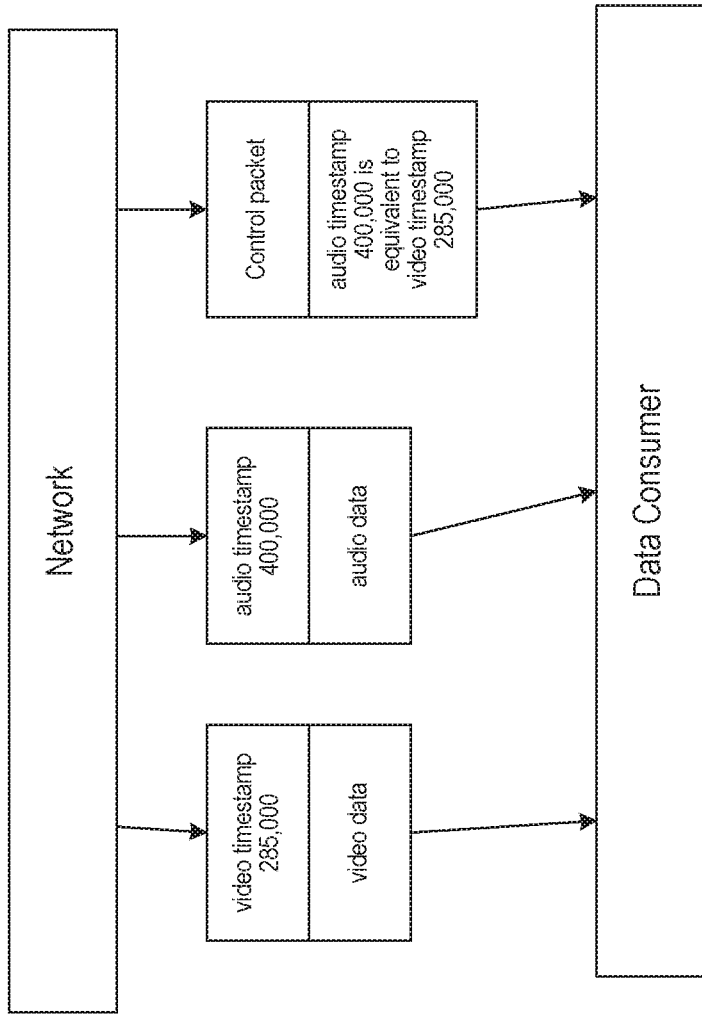
FIG. 22 shows synchronizing consumption of multiple data streams according to the invention.

FIG. 22 shows synchronizing consumption of multiple data streams according to the invention. The present invention can be used to consume multiple data streams in synchronization amongst the group AND maintain synchronization of multiple streams at each individual consumer. For example, the consumer may be receiving a stream of video data and a stream of audio data, and rendering both streams in a media player. If the two data streams are already in sync with each other at the data source (e.g. audio and video are in sync), then the consumption timestamps assigned by the data source will guarantee that the video and audio remain in sync at the consumer. Thus, all video and all audio data will be consumed in synchronization across all group members.

FIG. 22 shows that the data source can send a control packet containing additional information to aid in the synchronization of multiple data streams. This information is not strictly necessary, since the multiple data streams can be synchronized using the consumption timestamps associated with the data in each stream. However, it may be more convenient for the data source to send consumption timestamps for only one of the streams (e.g. video), in which case these control packets would allow the consumer to synchronize the other stream (e.g. audio) with the aforementioned stream (video). These control packets can also be used to synchronize the two streams if certain GCTS packets are lost or corrupted.

Figure 23:
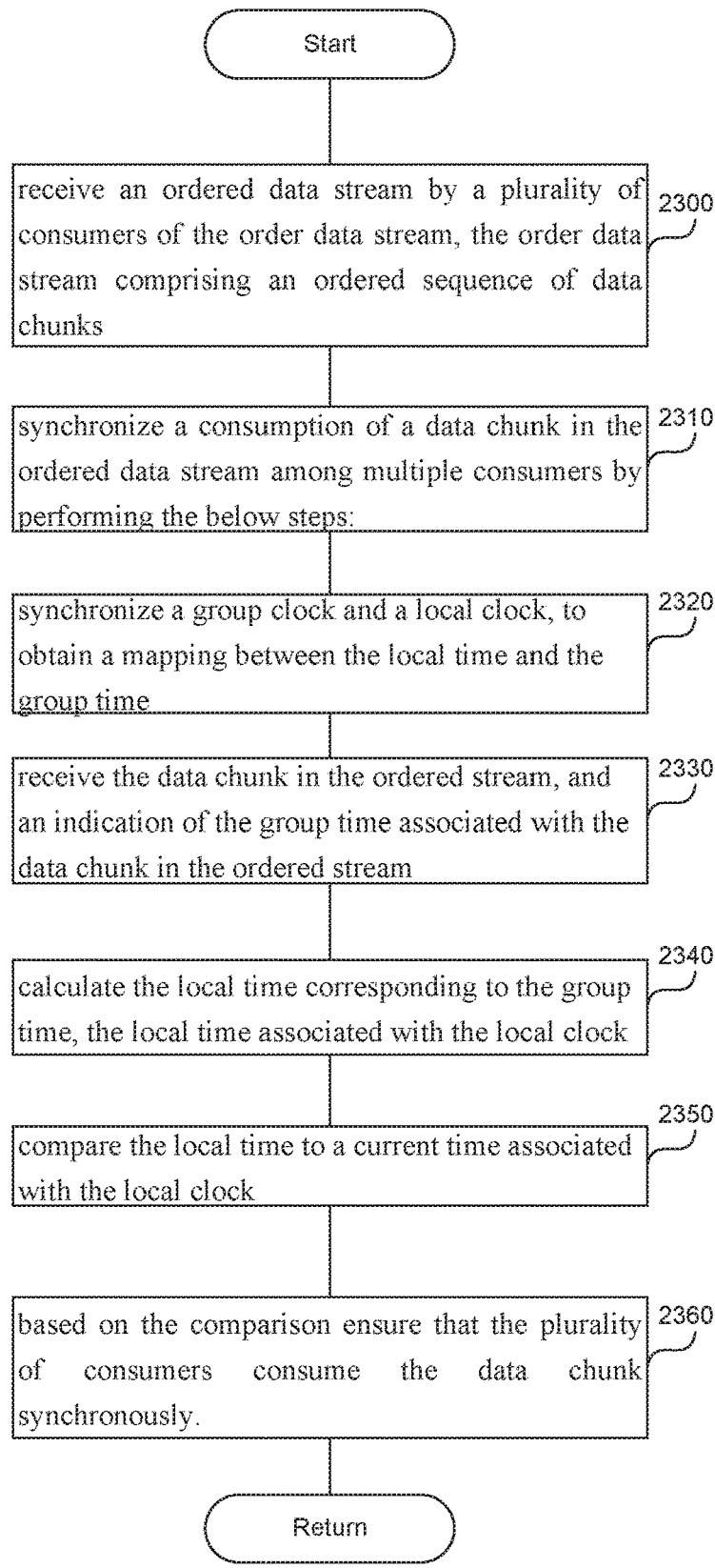
FIG. 23 is a flowchart of a method to synchronize a consumption of a data chunk among multiple consumers, according to one embodiment.

FIG. 23 is a flowchart of a method to synchronize consumption of a data chunk among multiple consumers, according to one embodiment. In step 2300, one or more consumers can receive an ordered data stream which includes an ordered sequence of data chunks. The data chunk can be a video frame, a section of a video frame, and/or a section of audio, while being ordered data stream can be a video file or an audio file. In step 2310, a consumption of a data chunk in the ordered data stream can be synchronized among the consumers by using the following steps.

In step 2320, prior to initiating the consumption of the ordered data stream processor can synchronize a group clock indicating a group time at which the consumers should consume the data chunk and a local clock indicating a local time of a consumer. The processor obtains a mapping between the local time and the group time. The processor can be associated with a consumer as shown in FIGS. 1-22.

For example, to synchronize the group clock and the local clock, the processor can obtain multiple group times associated with the group clock and multiple local times corresponding to the group times. Local times can account for network latency in receiving the group time as described in the section titled "Detailed Discussion of Clock Synchronization" of this application. For example, if there is no network latency, local time can be the time at which the group time was received. However, the processor can measure the network latency, meaning travel time for the group time sent by the group clock to reach the processor of the consumer. In that case, local time can be expressed as (local time at which the group time was received—travel time of the group time). Based on the group times and the corresponding local times, the processor can calculate a linear correspondence between the group clock and the local clock as shown in equations AA and BB.

In step 2330, the processor can receive the data chunk in the ordered data stream, and an indication of the group time associated with the data chunk in the ordered data stream. Indication of the group time can be the actual group time associated with the data chunk, GCTS, as described in this application. Further, the indication of the group time can be a video timestamp from which GCTS can be calculated, as described in this application. In step 2340, based on the group time and the mapping between the local time and the group time, the processor can calculate the local time corresponding to the group time, where the local time associated with the local clock.

In step 2350, the processor can compare the local time to a current time associated with the local clock to obtain a comparison indicating whether the local time associated with the data chunk is before the current time, substantially identical to the current time, or after the current time. In step 2360, based on the comparison the processor can ensure that the consumers consume the data chunk synchronously by dropping the data chunk, adjusting a time duration of the data chunk, or consuming the data chunk. Time duration of the data chunk can be computed based on the consumption rate of the ordered data stream, or consumption time of the subsequent frame. For example, the consumption rate of the ordered data stream can be expressed as a number of data chunks per second, such as frames per second. Consequently, the duration of a single data chunk corresponds to the 1 sec/(number of data chunks per second). In another example, the time duration of the data chunk can be calculated as (group time associated with the data chunk mine is group time associated with the subsequent data chunk).

The processor can determine that the current time is before the local time, meaning that the data chunk should be shown at a later time. The processor can place the data chunk in a received sequence of data chunks in a location indicating the local time associated with the data chunk.

The processor can determine that the current time is within a time range defined by the local time and the time duration of the data chunk, meaning that the data chunk should be in the process of being consumed. The processor can decrease the time duration of the data chunk to not exceed the planned time duration of the data chunk. Finally, the consumer receiving the data chunk can consume the data chunk for the extent of time corresponding to the decreased time duration.

The processor can determine that the current time is after the local time, meaning that the time to consume the data chunk has passed. The processor can drop the data chunk.

The processor can determine that a second data chunk following a previously consumed data chunk is not available because, for example, of network delays or network errors. The processor can extend a time duration of the previously consumed data chunk to prevent an interruption in the consumption of the ordered data stream.

The processor can synchronize the group clock and the local clock during the consumption of the ordered data stream to account for any drift between the 2 clocks that occurred since the rash synchronization. By occasionally synchronizing during the consumption of the data stream, the processor improves the mapping between the local time and the group time.

Figure 24:
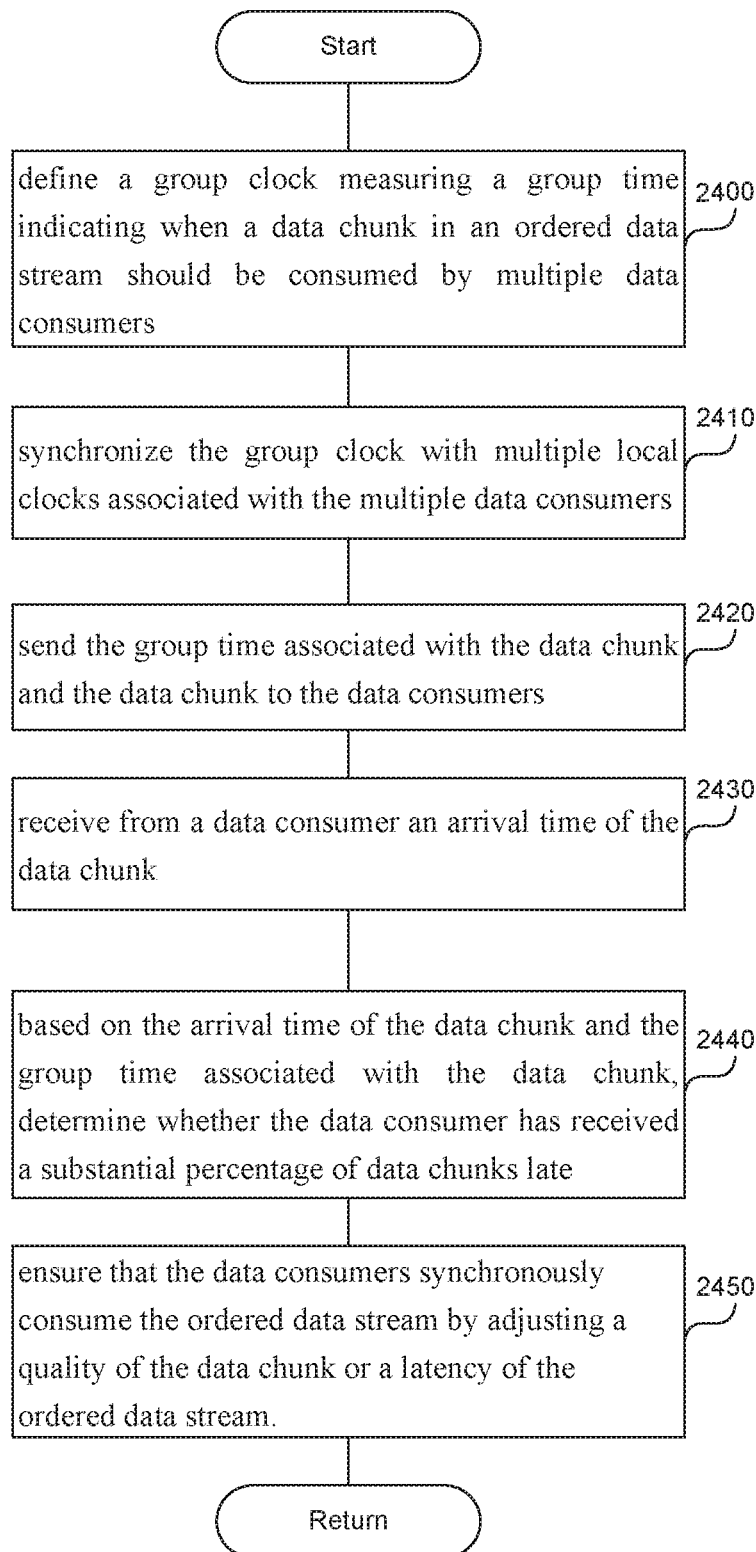
FIG. 24 is a flowchart of a method to synchronize a consumption of a data chunk among multiple consumers, according to another embodiment.

FIG. 24 is a flowchart of a method to synchronize consumption of a data chunk among multiple consumers, according to another embodiment. In step 2400, a group clock can be defined in hardware and/or software. For example, the group clock can be a physical clock, or can be implemented as a software application. The group clock can measure a group time indicating when a data chunk in an ordered data stream should be consumed by multiple consumers. The group clock can be implemented in manners described in FIGS. 4-6.

In step 2410, a processor can synchronize the group clock with multiple local clocks associated with the consumers requesting to consume the ordered data stream. To synchronize, the processor can send multiple group times to the consumers. The processor can execute instructions of the software application implemented in the group clock, or the processor can be in communication with the group clock implemented in hardware and/or software. The processor can be associated with the servers shown in FIGS. 1, 4, 5.

In step 2420, the processor can send the group time associated with the data chunk and the data chunk to the consumers. The processor can synchronously send the group time and the data chunk to all the consumers, or the processor can send the group time in the data chunk asynchronously, i.e. at different times, 2 different consumers, as described in this application, for example FIG. 17.

In step 2430, the processor can receive from a consumer an arrival time of the data chunk. The arrival time of the data chunk can be expressed in group time because the consumer can establish the mapping between the local time and the group time. In other words, the consumer knows the local time when the data chunk has arrived, i.e. the arrival time, and can calculate the group time corresponding to the arrival time. The consumer can send the group time corresponding to the arrival time to the processor.

In step 2440, based on the arrival time of the data chunk and the group time associated with the data chunk, the processor can determine whether the consumer has received a substantial percentage of data chunks late. Substantial percentage can be 10% or more. If the arrival time of the data chunk is after the group time, the processor can note that the consumer has received the data chunk late.

In step 2450, if, for example, more than 10% of the data chunks have been received late, the processor can ensure that the consumers synchronously consume the ordered data stream by adjusting a quality of the data chunk or a latency of the ordered data stream, as described in this application.

To adjust the quality of the data chunk, the processor can obtain a setting specifying a minimum quality threshold associated with the data chunk. For example, the quality threshold can specify that the video bitrate must be above 2.5 Mbits per second.

The processor can determine whether reducing the quality of the data chunk to the minimum quality threshold prevents the substantial percentage of data chunks to be received late by the consumer. For example, the processor can reduce the video bit rate to the minimum quality, and based on the arrival times gathered from the consumers, can determine whether there is a consumer still receiving a substantial percentage of the data chunks late. In another example, the processor can determine the lowest network throughput based on the arrival times and the corresponding group times, by calculating, for example:

network throughput=Σ(data delivered to the consumer)/Σ(arrival times-corresponding group times).

If the network throughput is equal to or greater than the minimum bit rate, the processor can reduce the quality of input. Specifically, the processor can reduce the quality of the input to the bit rate equal to or lower than the network throughput, and send the data chunk to the consumer that has received the substantial percentage of data chunks late. The remainder of the consumers can receive higher-quality data chunks.

If the network throughput is less than the minimum bit rate, the processor cannot reduce the quality of the input. Instead, the processor can increase latency associated with the data chunk. Specifically, the processor can increase the group time associated with the data chunk, so that the group time is the same or slightly after the arrival time of the data chunk at the consumer receiving the data chunk at the latest time. In this way, the processor can ensure that each consumer consumes the data chunk at the same time as the consumer receiving the data chunk at the latest time. Consequently, the processor can ensure synchronization of consumption between the consumers.

The processor can receive a request from a new consumer to join the consumers while they are consuming the data stream. The processor can send to the new consumer a second data chunk and a second group time associated with the second data chunk. The second group time can be later than the group time currently being sent to the consumers.

Computer System

Figure 25:
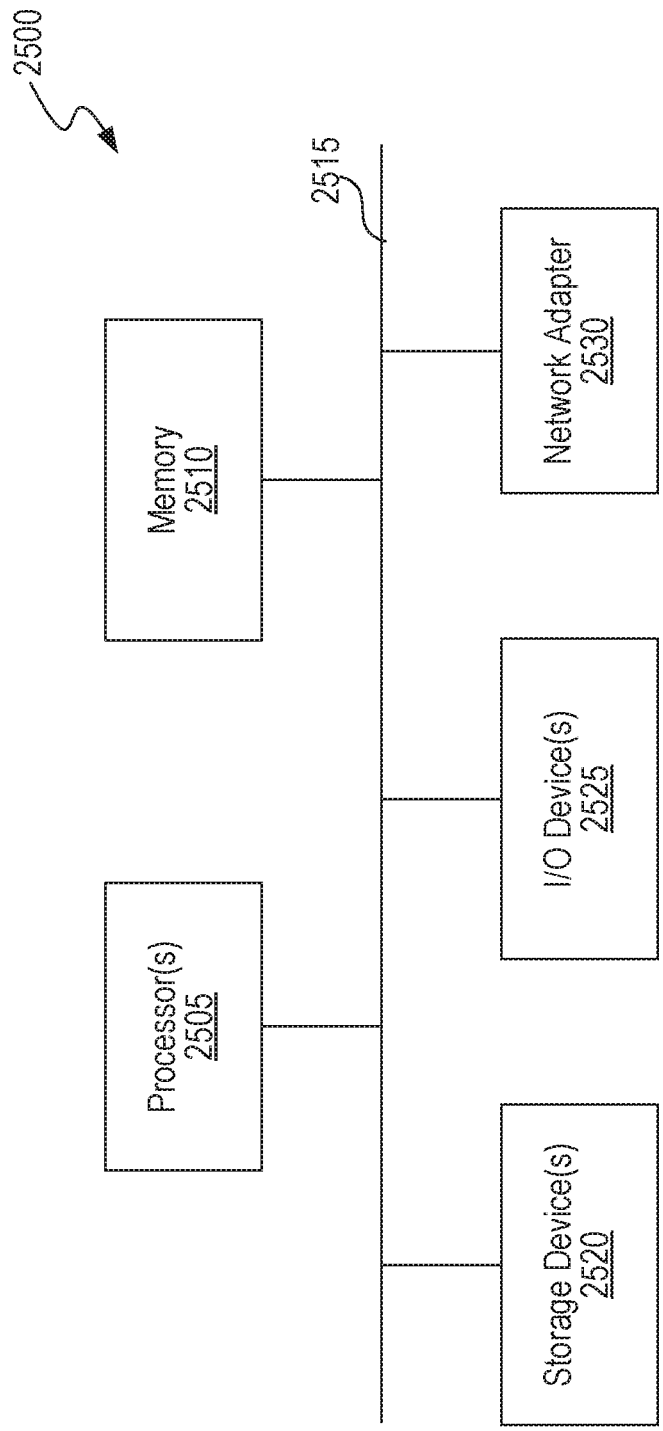
FIG. 25 shows a diagrammatic representation of a machine in the example form of a computer system within which a set of instructions for causing the machine to perform one or more of the methodologies discussed herein may be executed.

FIG. 25 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, a switch or bridge, a console, a hand-held console, a (hand-held) gaming device, a music player, any portable, mobile, hand-held device, wearable device, or any machine capable of executing a set of instructions, sequential or otherwise, that specify actions to be taken by that machine.

The computing system 2500 may include one or more central processing units ("processors") 2505, memory 2510, input/output devices 2525, e.g. keyboard and pointing devices, touch devices, display devices, storage devices 2520, e.g. disk drives, and network adapters 2530, e.g. network interfaces, that are connected to an interconnect 2515. The interconnect 2515 is illustrated as an abstraction that represents any one or more separate physical buses, point to point connections, or both connected by appropriate bridges, adapters, or controllers. The interconnect 2515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 2510 and storage devices 2520 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer readable transmission media.

The instructions stored in memory 2510 can be implemented as software and/or firmware to program the processor 2505 to carry out actions described above. In some embodiments, such software or firmware may be initially provided to the processing system 2500 by downloading it from a remote system through the computing system 2500, e.g. via network adapter 2530.

The various embodiments introduced herein can be implemented by, for example, programmable circuitry, e.g. one or more microprocessors, programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
    defining a group clock measuring a group time indicating when a data chunk in an ordered data stream should be consumed by a plurality of consumers;
    synchronizing the group clock with a plurality of local clocks associated with the plurality of consumers requesting to consume the ordered data stream, said synchronizing comprising sending a plurality of group times to the plurality of consumers;
    sending the group time associated with the data chunk and the data chunk to the plurality of consumers;
    receiving from a consumer in the plurality of consumers an arrival time of the data chunk;
    based on the arrival time of the data chunk and the group time associated with the data chunk, determining whether the consumer has received a substantial percentage of data chunks late; and
    upon determining that the consumer has received the substantial percentage of data chunks late, ensuring that the plurality of consumers synchronously consume the ordered data stream by adjusting a quality of the data chunk or a latency of the ordered data stream.

2. The method of claim 1, comprising:

obtaining a setting specifying a minimum quality threshold associated with the data chunk sent to the consumer in the plurality of consumers;

determining whether reducing the quality of the data chunk to the minimum quality threshold prevents the substantial percentage of data chunks to be received late by the consumer; and upon determining that reducing the quality of the data chunk to the minimum quality threshold prevents the substantial percentage of data chunks to be received late, reducing the quality of the data chunk to at most the minimum quality threshold, and sending the data chunk to the consumer that has received the substantial percentage of data chunks late.

3. The method of claim 1, comprising:

upon determining that the consumer has received the substantial percentage of data chunks late, reducing the quality of the data chunk sent to the consumer until the substantial percentage of data chunks are not received late.

4. The method of claim 1, comprising:

obtaining a setting specifying a minimum quality threshold associated with the data chunk sent to the consumer in the plurality of consumers;

determining whether reducing the quality of the data chunk to the minimum quality threshold prevents the substantial percentage of data chunks to be received late by the consumer; and upon determining that reducing the quality of the data chunk to the minimum quality threshold does not prevent the substantial percentage of data chunks to be received late, increasing the group time associated with the data chunk and sent to the plurality of consumers to a later time corresponding to the arrival time of the data chunk at the consumer receiving the substantial percentage of data chunks late, thereby ensuring synchronization of consumption between the plurality of consumers.

5. The method of claim 1, comprising:

receiving a request from a new consumer to join the plurality of consumers while the plurality of consumers are consuming the ordered data stream; and sending to the new consumer a second data chunk and a second group time associated with the second data chunk, wherein the second group time is later than the group time currently being sent to the plurality of consumers.

* * * * *